US012748743B1

(12) United States Patent
Lakshminarasimhan et al.

(10) Patent No.: US 12,748,743 B1
(45) Date of Patent: Sep. 29, 2026

(54) OPTIMAL TECHNIQUE FOR BUILDING INDEXES ON DATABASES

(71) Applicant: Kyndryl, Inc., New York, NY (US)

(72) Inventors: Sriram Lakshminarasimhan, Chennai (IN); Gonella Vamsi Charan, Bangalore (IN); Marci Formato, Clintondale, NY (US)

(73) Assignee: Kyndryl, Inc., New York, NY (US)

( * ) Notice: Subject to any disclaimer, the term of this patent is extended or adjusted under 35 U.S.C. 154(b) by 0 days.

(21) Appl. No.: 19/188,210

(22) Filed: Apr. 24, 2025

(51) Int. Cl.
*G06F 16/00* (2019.01)
*G06F 16/22* (2019.01)
*G06F 16/23* (2019.01)

(52) U.S. Cl.
CPC ...... *G06F 16/2246* (2019.01); *G06F 16/2282* (2019.01); *G06F 16/2365* (2019.01)

(58) Field of Classification Search
CPC ............. G06F 16/2246; G06F 16/2282; G06F 16/2365
USPC .......................................................... 707/797
See application file for complete search history.

(56) References Cited

U.S. PATENT DOCUMENTS

2018/0121494 A1* 5/2018 Antonopoulos .... G06F 16/2365
2020/0250163 A1 8/2020 Kuimelis et al.
2021/0303539 A1 9/2021 Zait et al.
2021/0349874 A1 11/2021 Zakas et al.
2023/0385261 A1 11/2023 Siddiqui et al.

OTHER PUBLICATIONS

"Resumable Online Index Rebuild in SQL Server" by: Panagiotis Antonopoulos https://dl.acm.org/doi/pdf/10.14778/3137765.3137779 (Year: 2017).*

Antonopoulos et al., "Resumable Online Index Rebuild in SQL Server", Proceedings of the VLDB Endowment, vol. 10, No. 12, Aug. 1, 2017, pp. 1742-1753.

International Search Report and Written Opinion; Date of Mailing: Nov. 28, 2025; Application No. PCT/EP2025/065421; Filing Date: Jun. 4, 2025; 16 pgs.

Anonymous, "Method of Implementing Optimal Storage While Creating/Rebuilding Multiple Indexes", IP.com No. IPCOM000247954D, Oct. 14, 2016, 5 pages.

Lakshminarasimhan et al., "Accelerate Database Join Performance Using Multi-Object Index", U.S. Appl. No. 19/188,198, filed Apr. 24, 2025.

* cited by examiner

*Primary Examiner* — Chelcie L Daye
(74) *Attorney, Agent, or Firm* — CANTOR COLBURN LLP; Erik Swanson

(57) ABSTRACT

Embodiments relate to an optimal technique for building indexes on databases. Aspects include receiving a request to build a new index for a column in a table, determining that an existing index includes the column requested in the request, and extracting the record identifiers associated with the column from the existing index. Aspects include building the new index as a data structure comprising the record identifiers extracted from the existing index without parsing the table.

20 Claims, 14 Drawing Sheets

FIG. 4

S – SUPPLIER TABLE

| | SN | SNAME | STATUS | CITY |
|---|---|---|---|---|
| R1 | S1 | SMITH | **20** | **LONDON** |
| R2 | S2 | JONES | 10 | PARIS |
| R3 | S3 | BLAKE | 30 | PARIS |
| R4 | S4 | CLARK | **20** | **LONDON** |
| R5 | S5 | ADAMS | 30 | ATHENS |

FIG. 5

P – PARTS TABLE

| | PN | PNAME | COLOR | WEIGHT | CITY |
|---|---|---|---|---|---|
| R1 | P1 | NUT | RED | 12 | **LONDON** |
| R2 | P2 | BOLT | GREEN | 17 | PARIS |
| R3 | P3 | SCREW | BLUE | 17 | ROME |
| R4 | P4 | SCREW | RED | 14 | PARIS |
| R5 | P5 | CAM | BLUE | 12 | **LONDON** |

QUERY FOR JOIN OPERATION

NEW INDEX BUILT ON CITY FOR SINGLE TABLE

MULTI-OBJECT INDEX ON CITY AND STATUS

FIG. 12

1202

EXISTING INDEX

| CITY | STATE |
|---|---|
| ALBANY | GEORGIA |
| ALBANY | NEW YORK |
| AUSTIN | MINNESOTA |
| AUSTIN | TEXAS |
| PORTLAND | MAINE |
| PORTLAND | OREGON |
| SALEM | OREGON |
| SPRINGFIELD | ILLINOIS |
| SPRINGFIELD | MASSACHUSETTS |
| SPRINGFIELD | MISSOURI |

EXAMPLE EXISTING ROOT PAGE

1212

NEW INDEX

| STATE | CITY |
|---|---|
| GEORGIA | ALBANY |
| ILLINOIS | SPRINGFIELD |
| MAINE | PORTLAND |
| MASSACHUSETTS | SPRINGFIELD |
| MINNESOTA | AUSTIN |
| MISSOURI | SPRINGFIELD |
| NEW YORK | ALBANY |
| OREGON | PORTLAND |
| OREGON | SALEM |
| TEXAS | AUSTIN |

EXAMPLE NEW ROOT PAGE

OPTIMAL TECHNIQUE FOR BUILDING INDEXES ON DATABASES

BACKGROUND

The present invention generally relates to computer systems, and more specifically, to computer-implemented methods, computer systems, and computer program products configured and arranged to provide an optimal technique for building indexes on databases.

An index for a database is a pointer to data in a table. It is similar to an index in the back of a book, which lists all the topics alphabetically and are then referred to one or more specific page numbers. Indexes are data structures that can increase a database's efficiency in accessing tables. Every index is associated with a table and has a key, which is formed by one or more table columns. By comparing keys to the index, it is possible to find one or more database records with the same value.

In computing, a database is an organized collection of data or a type of data store based on the use of a database management system (DBMS), the software that interacts with end users, applications, and the database itself to capture and analyze the data. The database management system additionally encompasses the core facilities provided to administer the database. The database, the database management system, and the associated applications can be referred to as a database system.

SUMMARY

Embodiments of the present invention are directed to computer-implemented methods for optimal technique for building indexes on databases. A non-limiting computer-implemented method includes receiving a request to build a new index for a column in a table and determining that an existing index includes the column requested in the request. The method includes extracting the record identifiers associated with the column from the existing index and building the new index as a data structure comprising the record identifiers extracted from the existing index without parsing the table.

Other embodiments of the present invention implement features of the above-described methods in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 4 depicts an example supplier table according to one or more embodiments;

FIG. 5 depicts an example parts table according to one or more embodiments;

FIG. 12 depicts an example of a new index sorted in a different arrangement than an existing index according to one or more embodiments;

DETAILED DESCRIPTION

Figure 1:
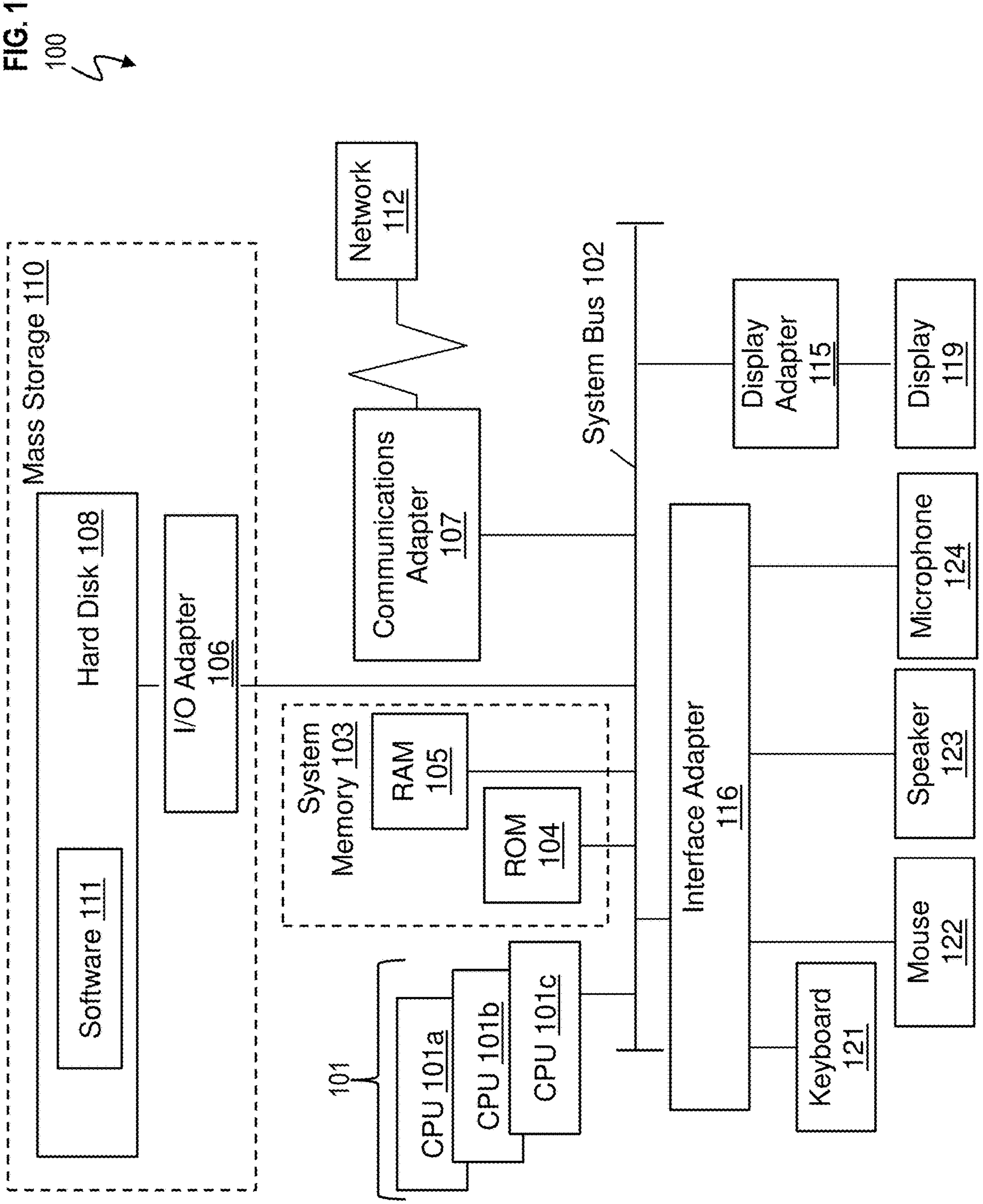
FIG. 1 depicts a block diagram of an example computer system for use in conjunction with one or more embodiments.

One or more embodiments are configured and arranged to provide optimal techniques for building indexes on databases. The system is configured to utilize a smart index build process with no inputs and outputs to and from the table while building the new index. When a request to create a new index for a table is received, the system checks a metadata database for existing indexes with the relevant column key values or columns. Once an existing index is found, the system utilizes the available column key values and record identifiers from the existing index to build the new index B-tree, which eliminates the need to read the table data.

In one or more embodiments, the smart index build approach can be used for a multi-object index on two or more tables where the smart build engine combines information from existing indexes/indices, streamlining and accelerating the creation of a new multi-object index. Also, the same smart index build approach can be used to build a new index from existing multiple indexes of a single table. The smart index build is faster than the traditional index build process on a computer system, by utilizing fewer CPU resources and fewer I/O processes, in accordance with one or more embodiments.

A database index is a data structure that improves the speed of data retrieval operations on a database table at the cost of additional writes and storage space to maintain the index data structure. Indexes are used to quickly locate data without having to search every row in a database table every time the table is accessed. Indexes can be created using one or more columns of a database table, providing the basis for both rapid random lookups and efficient access of ordered records. The index is a copy of selected columns of data, from a table, that is designed to enable very efficient search. An index normally includes a direct link to the original row of data from which it was copied, to allow the complete row to be retrieved efficiently.

Database systems form the backbone of computer systems having modern data management for "big data," by providing a structured and efficient way to organize, store, and retrieve information. Big data primarily refers to data sets that are too large or complex to be dealt with by traditional data-processing software and is usually described by volume, velocity, and variety. Big data analysis challenges include capturing data, data storage, data analysis, search, sharing, transfer, visualization, querying, updating, information privacy, and data source. Big data is too large to be processed by the human mind with the aid of pen and paper.

A relational database is a type of database that organizes data into rows and columns, which collectively form a table where the data points are related to each other. While a relational database organizes data based off a relational data model, a relational database management system (RDBMS) is a more specific reference to the underlying database software that enables users to maintain it. These programs allow users to create, update, insert, or delete data in the system, and they provide data structure, multi-user access, privilege control, and network access. The structured query language (SQL) also makes it easy to retrieve datasets from multiple tables and perform simple transformations such as filtering and aggregation. The use of indexes (or indices) within relational databases also allows them to locate this information quickly without searching each row in the selected table. Examples of popular RDB MS systems include MySQL®, PostgreSQL®, IBM® DB2®, etc.

A "JOIN operation" in a database, particularly in the SQL, is a function that combines rows from multiple tables into a single result set based on a shared column value between them, allowing one to retrieve related data from different tables in a relational database by specifying how the tables are connected through a common field.

With respect to querying big data, one aspect of relational database management systems (RDBMS) is the ability to establish relationships between tables, enabling the extraction of meaningful insights from complex datasets. In the context of RDBMS, a JOIN operation is a pivotal feature that facilitates the combination of data from multiple tables based on related columns. The JOIN operation plays a primary role in addressing the inherent normalization of relational databases, where data is distributed across various tables to eliminate redundancy. The JOIN operation allows database developers and analysts to correlate information from different tables, creating a unified and comprehensive dataset. This is achieved by matching rows in one table with corresponding rows in another table based on specified conditions, typically involving keys or common attributes.

Even the best JOIN methods, with the most common one being nested loop join, require a substantial amount of input/output (I/O) processing to satisfy complex queries. In addition to straining the central processing unit (CPU) resources, the intensive I/O processing also causes other problems including contention and response time issues for other processes in the database system. In database management systems, block contention (or data contention) refers to multiple processes or instances competing for access to the same index or data block at the same time. In general, this can be caused by very frequent index or table scans, or frequent updates. Concurrent statement executions by two or more instances may also lead to contention and subsequently waiting because the table is locked. An index scan occurs when the database engine uses an index to find the rows that satisfy a query. Instead of scanning the entire table, the engine scans the index, which is typically much smaller and faster to search through. This is particularly useful for queries that filter on indexed columns, as it can speed up data retrieval. A table scan happens when the database engine reads every row in a table to find the rows that match the query criteria. This method is used when there is no suitable index available for the query. While table scans can be efficient for small tables, they can become very slow and resource-intensive for larger tables.

Some example approaches to address issues with join operations are discussed below. 1) Advanced Join Algorithms: RDBMS systems employ sophisticated join algorithms, such as nested loop joins, hash joins, and merge joins to optimize the performance of joining operations. 2) Query Optimization: Database management systems utilize query optimization techniques to analyze and select the most efficient join strategy based on factors like table sizes, available indexes, and statistical information. 3) Parallel Processing: Some RDBMS platforms leverage parallel processing capabilities to enhance the speed of join operations, especially when using large datasets. 4) Indexing Strategies: Indexing plays a fundamental role in optimizing join performance. Advanced indexing strategies, including bitmap and composite indexes, are employed to speed up query execution. 5) Materialized Views: Materialized views are used to store precomputed results of join operations, reducing the need for repetitive joins and improving query response times.

The typical approaches have various limitations. 1) Complex Query Optimization: Joining multiple tables in complex queries can still pose challenges for RDBMS query optimizers, and determining the most efficient execution plan may be computationally expensive especially with dynamically changing underlying table data distributions and column filter factors. 2) Performance on Large Datasets: Joining large tables can result in performance bottlenecks, even with optimized algorithms. Addressing big data scenarios may require additional considerations, such as distributed computing or specialized databases. 3) Indexing Overhead: While indexing improves query performance, maintaining indexes comes with overhead in terms of storage and update costs. Striking a balance between the benefits of indexing and the associated costs is an ongoing challenge.

Additional limitations of typical approaches include the following. 1) Limited Parallelization: While some RDBMS systems support parallel processing, the extent of parallelization may be limited, and achieving optimal scalability remains a challenge in certain cases. 2) Real-time Analytics: Joining large tables for real-time analytics can be resource intensive. Solutions for providing low-latency access to real-time data in joined formats are areas that continue to be explored. 3) Cross-Platform Compatibility: Compatibility and optimization challenges may arise when joining tables across different RDB MS platforms, especially in heterogeneous database environments.

One or more embodiments are configured to accelerate database join performance of tables using a multi-object index discussed herein. Frequently, a database system encounters scenarios where large tables are joined to produce results. Each table may have one or more indexes, and these indexes are joined to obtain the results in one or more embodiments. A II database systems have some type of statement caching structures that stores the SQL statements executed in the system over a period of time for detailed analysis. Modern database systems also have an artificial intelligence (AI) engine that frequently parses the SQL statement cache to study SQL usage patterns. In accordance with one or more embodiments, the AI engines can be leveraged to identify columns (e.g., including their column key values) used frequently for joining tables. Based on this input, multi-object indexes are built on the JOIN columns that contain pointers to qualifying rows on the tables involved in the JOIN, in accordance with one or more embodiments. When asked (in a request) to execute a complex SQL query, the database system is configured to check for the presence of a multi-object index that satisfies the JOIN criteria of the SQL statement. The database system can then swiftly query the multi-object index, which is a tree data structure, to directly reach the rows containing the needed data on the respective tables. In one or more embodiments, the multi-object index is a data structure intentionally designed to cater to hundreds of JOIN criteria rather than thousands to ensure the maintenance overheads of such indexes are sustainable. In one or more embodiments, the multi-object index may be created for thousands of JOIN criteria if desired. By analyzing the query execution metadata, the database software determines that a multi-object index on a first column of a first table and a second column of a second table would significantly improve join performance and therefore initiates its creation. Furthermore, typical approaches such as materialized views are static in nature like a snapshot whereas the multi-object index enables the dynamic querying of the base table data efficiently.

The construction and deconstruction of the multi-object indexes can occur in waves such that the multi-object indexes are ephemeral. This means that the multi-object index is temporarily constructed when the same join operation for particular tables is frequently requested and then deconstructed with the frequency of requests for that same join operation falls below a frequency threshold. This approach offers a rapid access path for complex queries under the appropriate circumstances.

The present disclosure provides various technical effects and solutions. One or more embodiments provide a smart index build that builds a new index on a table by using one or more exiting indexes and without accessing the table(s), thereby avoiding table/database locks and resulting in no I/O processing to/from the table during the build. One or more embodiments introduce of a new indexing structure, as the multi-object index, which simultaneously holds pointers to rows (as record identifiers) in multiple tables containing column values used frequently in SQL JOINs. As such, the multi-object index is a single index for two, three, four, etc., tables related to, for example, columns in the respective tables. The multi-object index, as this new indexing structure, significantly reduces the I/O requirements of intensive database queries and reduces CPU and run times of the queries in question. One or more embodiments disclose a novel option to create multi-object indexes by having two modes based on a set of criteria, which are sandcastle mode as a temporary mode and full-index mode. The more effort required to build and maintain a multi-table index, the better value it brings in reducing CPU usage and reducing I/O processing. One or more embodiments disclose a novel method to create and build the multi-object indexes (as super-indexes) based on existing indexes and the usage pattern. The present disclosure can leverage existing AI capabilities in any RDBMS to perform autonomous lifecycle management of these multi-object index structures, which improves overall performance, optimizes storage utilization, and ensures the reusability of these structures across various workloads.

One or more embodiments described herein can utilize machine learning techniques to perform tasks, such as classifying a feature of interest. More specifically, one or more embodiments described herein can incorporate and utilize rule-based decision making and artificial intelligence reasoning to accomplish the various operations described herein, namely classifying a feature of interest. The phrase "machine learning" broadly describes a function of electronic systems that learn from data. A machine learning system, engine, or module can include a trainable machine learning algorithm that can be trained, such as in an external cloud environment, to learn functional relationships between inputs and outputs, and the resulting model (sometimes referred to as a "trained neural network," "trained model," "a trained classifier," and/or "trained machine learning model") can be used for classifying a feature of interest, for example. In one or more embodiments, machine learning functionality can be implemented using an Artificial Neural Network (ANN) having the capability to be trained to perform a function. In machine learning and cognitive science, ANNs are a family of statistical learning models inspired by the biological neural networks of animals, and in particular the brain. ANNs can be used to estimate or approximate systems and functions that depend on a large number of inputs. Convolutional Neural Networks (CNN) are a class of deep, feed-forward ANN's that are particularly useful at tasks such as, but not limited to analyzing visual imagery and natural language processing (NLP). Recurrent Neural Networks (RNN) are another class of deep, feed-forward ANNs and are particularly useful at tasks such as, but not limited to, unsegmented connected handwriting recognition and speech recognition. Other types of neural networks are also known and can be used in accordance with one or more embodiments described herein.

Turning now to FIG. 1, a computer system 100 is generally shown in accordance with one or more embodiments of the invention. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101*a*, 101*b*, 101*c*, etc., (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random-access memory (RAM) 105. The ROM 104 is coupled to the system bus 102 and may include a basic input/output system (BIOS) or its successors like Unified Extensible Firmware Interface (UEFI), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program products and the execution of such instruction are discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system to coordinate the functions of the various components shown in FIG. 1.

Additional input/output devices are shown as connected to the system bus 102 via a display adapter 115 and an interface adapter 116. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by the display adapter 115, which may include a graphics controller to improve the performance of graphics intensive applications and a video controller. A keyboard 121, a mouse 122, a speaker 123, a microphone 124, etc., can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI) and the Peripheral Component Interconnect Express (PCIe). Thus, as configured in FIG. 1, the computer system 100 includes processing capability in the form of the processors 101, storage capability including the system memory 103 and the mass storage 110, input means such as the keyboard 121, the mouse 122, and the microphone 124, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
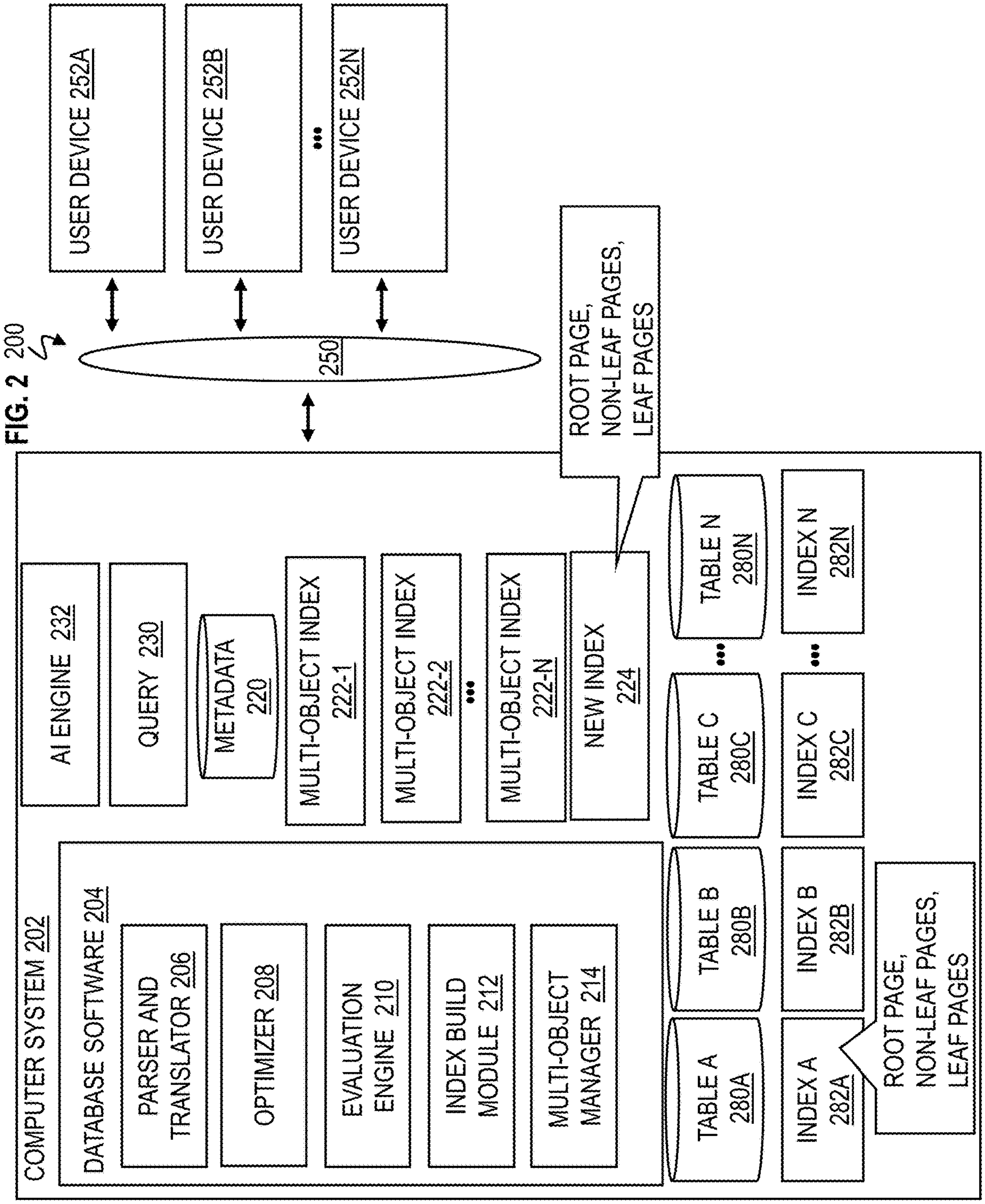
FIG. 2 depicts a block diagram of an example system configured to provide a smart index build process as an optimal technique for building indexes on databases, which is faster and utilizes fewer CPU resources and fewer I/O processes according to one or more embodiments.

FIG. 2 depicts a block diagram of an example system 200 configured to provide a smart index build as an optimal technique for building indexes on databases, which is faster (than a traditional index build method) and utilizes fewer CPU resources and fewer I/O processes (e.g., no I/O processes are utilized or needed to the table during the smart index build), in accordance with one or more embodiments. The smart index build can build a data structure as a new index based on one or more columns from an existing index or indexes on the same table. Also, the system 200 is configured to accelerate database join performance of tables on a computer system by building and then using a multi-object index such that the requested table data of the join request is returned to the user faster (as compared to not having the multi-object index), by utilizing fewer CPU resources and fewer I/O processes, in accordance with one or more embodiments. The system 200 includes a computer system 202 configured to communicate over a network 250 with many different computer systems, such as a user device 252A of user A, a user device 252B of user B, through a user device 252N of user N. The user device 252A, the user device 252B, through the user device 252N can generally be referred to as user devices 252. The user devices 252 can be a personal computer or laptop. The user devices 252 can be a mobile device such as a cellular phone or tablet or a smart device. A smart device is an electronic device, generally connected to other devices or networks via different wireless protocols that can operate to some extent interactively. Several notable types of smart devices are smartphones, smart speakers, tablets, smartwatches, smart bands, smart glasses, and many others.

The network 250 can be a wired and/or wireless communication network, and the communication network includes a telecommunications network, the public switched telephone network (PTSN), voice over IP (VOIP) network, etc. The communication network includes cellular networks, satellite networks, etc.

The computer systems 202 and user devices 252 can include various software and hardware components including software applications (apps) for communicating over the network 250 as understood by one of ordinary skill in the art.

The computer system 202 may include and/or be coupled to repositories 280A, 280B, 280C through 280N, which can generally be referred to as repository 280. In one or more embodiments, the repositories 280A, 280B, 280C, and 280N may include tables A, B, C, and N, respectively. In one or more embodiments, two or more tables can be in the same repository, although each repository is depicted with a single table for ease of understanding. Each table A, B, C, and N may have its own indexes. For example, table A can have index 282A (also referred to as index A), table B can have index 282B (also referred to as index B), table C can have index 282C (also referred to as index C), and table N can have index 282N (also referred to as index N). In a computer, a table is a structured collection of data organized into rows and columns, representing a specific data type within a database. A database is a larger system that holds multiple related tables, allowing for organized storage and retrieval of a large amount of data across different categories.

In one or more embodiments, the user device 252 may include client software to communicate with the computer system 202 in a server-client relationship. For example, the user device 252 can include software as a thin client. The software may include an application installed on the user devices 252 and/or coupled to the user devices 252 for access by users. In one or more embodiments, the user software may include a user interface use input can be included. The user software may include plugins, portals, webpages, remote connection software, etc., for access by the users in accordance with one or more embodiments. In one or more embodiments, the user selects an option to authorize the user software to execute on the user device 252. The execution of the user software generates an interactive user experience that allows structured query language (SQL) queries, statements, etc., to search, extract, and view data in the tables, as known by one of ordinary skill in the art.

The computer system 202, user devices 252, database software 204, an index build module 212, a multi-object index manager 214, AI engine 232, etc., can include functionality and features of the computer system 100 in FIG. 1 including various hardware components and various software applications such as software 111 which can be executed as instructions on one or more processors 101 in order to perform actions according to one or more embodiments of the invention. The database software 204 can include, be integrated with, and/or call other pieces of software, algorithms, application programming interfaces (A Pls), graphical user interfaces (GU Is), etc., to operate as discussed herein.

The computer system 202 may be representative of numerous computer systems and/or distributed computer systems configured to offer database services for tables with queries. The computer system 202 can be part of a cloud computing environment such as a cloud computing environment 50 depicted in FIG. 13, as discussed further herein.

Figure 3:
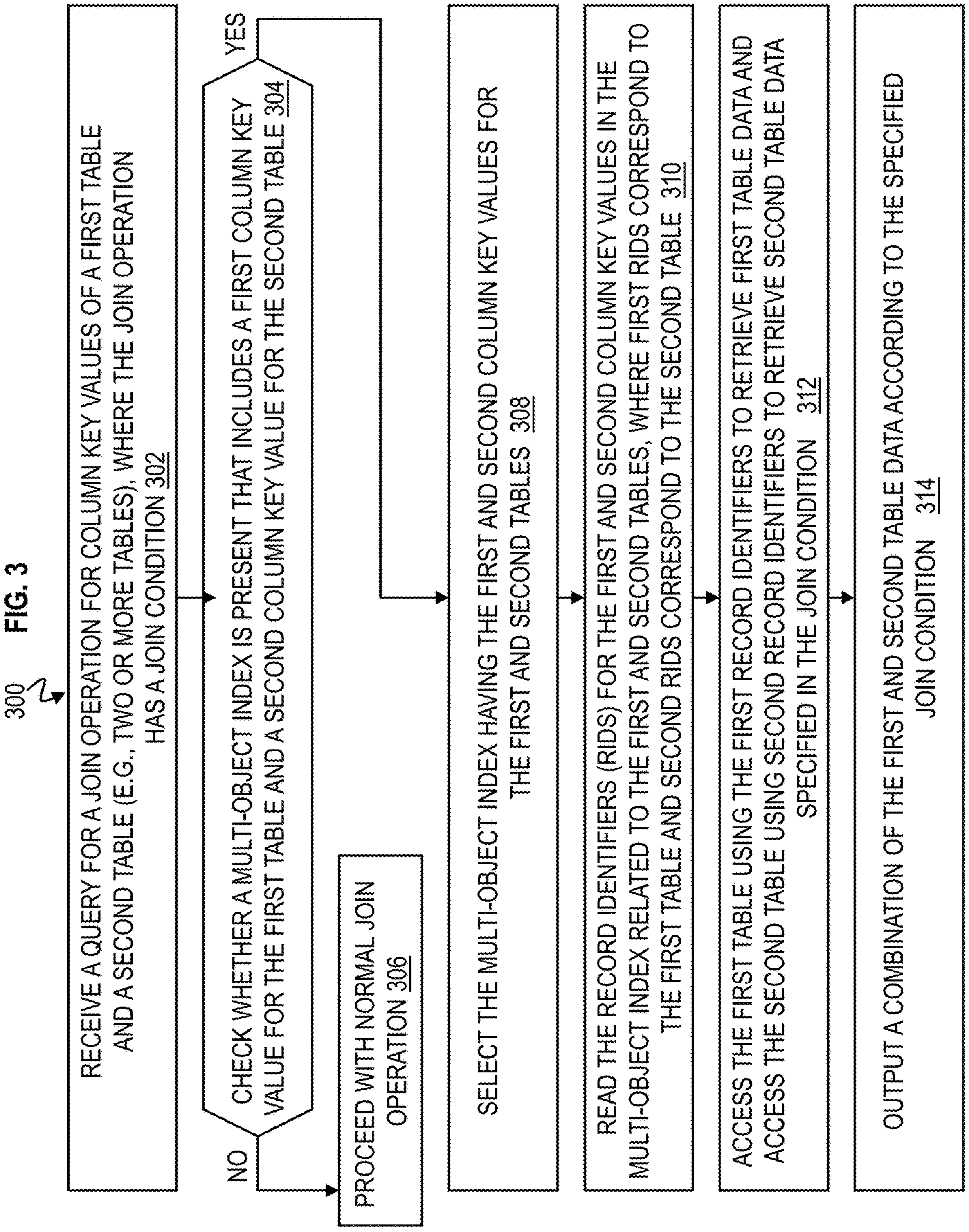
FIG. 3 depicts a flowchart of a computer-implemented method for accelerating database join performance of tables on a computer system using a multi-object index such that the requested table data of the join request is returned to the user faster, by utilizing fewer CPU resources and fewer I/O processes according to one or more embodiments.

FIG. 3 depicts a flowchart of a computer-implemented method 300 for providing accelerated database join performance of tables on a computer system using a multi-object index such that the requested table data of the join request is returned to the user faster (as compared to not having the multi-object index on two or more tables), by utilizing fewer CPU resources and fewer I/O processes, according to one or more embodiments.

At block 302 of the computer-implemented method 300, the database software 204 is configured to receive a database query 230 for a join operation for column key values of a first table and a second table, which could be two or more tables, where the join operation has a join condition. A column key value or key value is the value (e.g., name) of an entry in a column. In one or more embodiments, the computer system 202 may receive the database query 230 from a user device 252. In one or more embodiments, a user may input the database query 230 into the computer system 202. A database query is a request for data or information from a database. The database query allows users to retrieve, manipulate, and/or interact with the data stored in the database. Queries may be written in a specific query language, with SQL (Structured Query Language) being the most common. A join operation in SQL is used to combine rows from two or more tables based on a related column between them. The join operation is fundamental for querying data that is distributed across multiple tables.

The database software 204 is configured to parse and translate the database query 230 using any known technique. In one or more embodiments, the database software 204 may include, employ, and/or call a parser and translator module 206 to translate the database query into a format that can be interpreted and executed by the database/evaluation engine 210. The parser takes a query written in a high-level language (like SQL) and checks it for syntax errors, which ensures that the query follows the correct grammatical rules of the language. The translator converts the parsed query into a form that the database engine can understand and execute, which often involves translating the high-level query into a lower-level language or an intermediate representation. In one or more embodiments, the parser and translator module 206 may translate the database query 230 into a relational algebra expression.

At block 304, the database software 204 is configured to check whether a multi-object index is present that includes the first column key value for the first table and the second column key value for the second table as indicated in the database query 230. The database software 204 can call, employ, and/or include a database management system optimizer 208 to check and verify the presence of a suitable multi-object index having the first and second columns by checking a multi-object index manager 214. The multi-object index manager 214 maintains and stores a record of every multi-object index 222-1, multi-object index 222-2 through multi-object index 222-N, which can generally be referred to as multi-object indexes 222. The multi-object index manager 214 maintains and stores a record of every column (e.g., including column key values) and table for the multi-object indexes 222, such that when the first and second columns for the first and second tables are provided the multi-object index manager 214 can search and identify the corresponding multi-object index 222 that fulfills the search criteria when present.

The multi-object indexes 222 can be built be based on meeting requirements any of the following:

1) Frequently executed queries. The metadata database 220 can maintain the frequency/number of previously executed SQL queries, to determine when the frequency/number of previously used queries meet a predefined threshold.
2) Frequently used columns for JOINing multiple tables. The metadata database 220 can maintain the frequency/number of previously used join columns, to determine when the frequency/number of previously used join columns meet a predefined threshold.
3) Frequently used column key values for JOIN columns. The metadata database 220 can maintain the frequency/ number of column key values, to determine when the frequency/number of column key values meet a predefined threshold.

4) Compute times of query (e.g., elapsed time and CPU time). The metadata database 220 can maintain the compute times for each of the queries, to determine when the compute times meet a predefined threshold.

5) MULTI_OBJ_INDEX_CHECK to check if a multi-object index already exists on the JOIN column.

6) MULTI_OBJ_INDEX_USECOUNT to check how often a multiple object index is used.

At block 306, when (NO) there is no multi-object index that meets the search criteria, the database software 204 is configured to proceed with processing the database query 230 as a normal join operation.

At block 308, the database software 204 is configured to select the multi-object index 222 having the first and second columns for the first and second tables, without reading data from the first and second tables. For ease of understanding, the identified and selected multi-object index 222 can be the multi-object index 222-1, and the first and second tables can respectively be the table A in repository 280A and table B in repository 280B.

At block 310, the database software 204 is configured to read and filter the record identifiers (RIDS) in the selected multi-object index 222 (e.g., multi-object index 222-1) for the first and second columns for the first and second tables (e.g., table A and table B) to obtain/identify in the multi-object index 222 first record identifiers corresponding to the first table (e.g., table A) and second record identifiers corresponding to the second table (e.g., table B). Record identifiers are found in the leaf nodes of the multi-object index 222. Record identifiers are used to locate any pieces of data in a database. Record identifiers contain record location information (including pointers) and are used for index scans. In an index, all the pointers (RID or row identifier) to row data are located in the leaf pages. The column key value for the column and the corresponding record identifier are contained in the leaf page.

The multi-object index 222 can have a tree-like structure, known as a B-tree. A multi-object index can be for many columns for various tables according to the pattern of usage on which the multi-object index was built. A table has a column of arranged data corresponding to each row in the table, and the column of data has column key values or key values. For example, a column may be for cities, and the column key values are the particular names of the cities corresponding to each of the rows in the table. When the leaf nodes having record identifiers of a multi-object index are read, the database software 204 filters the record identifiers to find particular record identifiers that correspond to the specified first and second column key values of the first and second columns of the first and second tables of the database query 230 but not to other column key values for other tables. Accordingly, the record identifiers have been filtered to output the record identifiers that particularly correspond to the first and second column key values for the first and second columns of the first and second tables (e.g., table A and table B).

With the record identifiers that particularly correspond to the first and second column key values for the first and second tables (e.g., table A and table B), the database software 204 can call or employ the optimizer 208 to generate an execution plan. The execution plan can be generated using suitable technique as understood by one of ordinary skill in the art. An execution plan is a detailed roadmap created by the optimizer that outlines the steps the database/evaluator engine takes to execute the query and retrieve data from the table(s).

It is noted that no I/O processes have been required for data access to and from the first and second tables up to this point.

Figure 6:
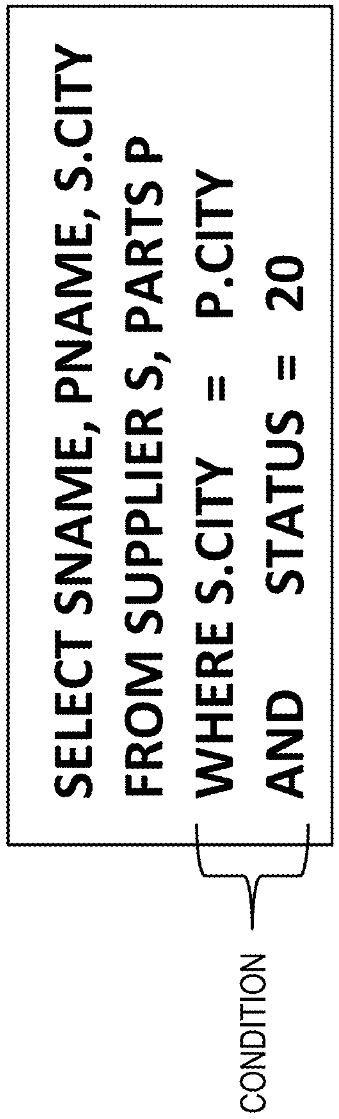
FIG. 6 depicts an example database query for a join operation according to one or more embodiments.

At block 312, the database software 204 is configured to access the first table (e.g., table A) using the first record identifiers to retrieve first table data and access the second table (e.g., table B) using the second record identifiers to retrieve second table data, according to the join condition of the database query 230. The first table data refers row data of rows in, for example, the table A, while the second table data refers to row data of rows in, for example, table B. Block 312 performs I/O processes (to/from the tables) to obtain the desired first table data and second table data using the first and second record identifiers, which also include additional column data specified in the database query 230. With reference to FIG. 6, an SQL Query can SELECT and retrieve multiple columns from one or more tables apart from the JOIN key columns. For the example SQL query in FIG. 6, SNAME and PNAME are the additional columns from which additional column data can be obtained.

At block 314, the database software 204 is configured to output the combination of the first and second table data according to the specified join operation in the database query 230. The computer system 202 sends the first and second table data to the user device 252. For example, the database software 204 can cause the first and second table data to be presented for display on the user device 252A with the desired data according to the database query 230.

An example scenario is discussed to further illustrate the multi-object index, but the example scenario is not meant to be limiting. FIG. 4 depicts an example supplier table(S), and FIG. 5 depicts an example parts table (P). In the example scenario, the database query 230 is a join operation for first and second columns (including one or more column key values) of a first table and a second table, which are respectively the supplier table in FIG. 4 and the parts table in FIG. 5. An example database query 230 for the join operation is depicted in FIG. 6. In FIG. 6, one column is SNAME, another column is PNAME, and yet another column is S.CITY. S.CITY represents the CITY column of the supplier table(S), while P.CITY represents the CITY column of the parts table (P) in order to distinguish them for the reader. The JOIN columns are S.CITY and P.CITY as first and second columns. Also, in the database query of FIG. 6, the tables are SUPPLIER S table and PARTS P table. The specified join condition is S.CITY=P.CITY and STATUS=20. In one or more embodiments, the multi-object index is created with the JOIN columns alone. However, in one or more embodiments, when there is a strong input from the database AI engine 232 that one or two additional columns can be included to improve the query performance, the additional columns apart from (e.g., in addition to) the JOIN column are included as part of the index key. These additional columns can enhance predicate processing. The database AI engine 232 can perform a cost-benefit analysis to include these additional columns. For example, in the example join operation in FIG. 6, the STATUS column can be included as part of the multi-object index for predicate evaluation, and the PNAME and SNAME columns can be included to avoid reading the table pages (e.g., resulting in INDEX ONLY access).

The database software 204 is configured to check for and find a multi-object index 222 having the column SNAM E for the supplier table(S), the column PNAME for the parts table (P), and the column S.CITY for the supplier table(S).

For example, the database software 204 is configured to check the metadata database 220 for the existing multi-object index 222 defined on the JOIN key columns in a given query. The multi-object index 222 is for multiple objects because the index contains columns for multiple tables.

Figure 7A:
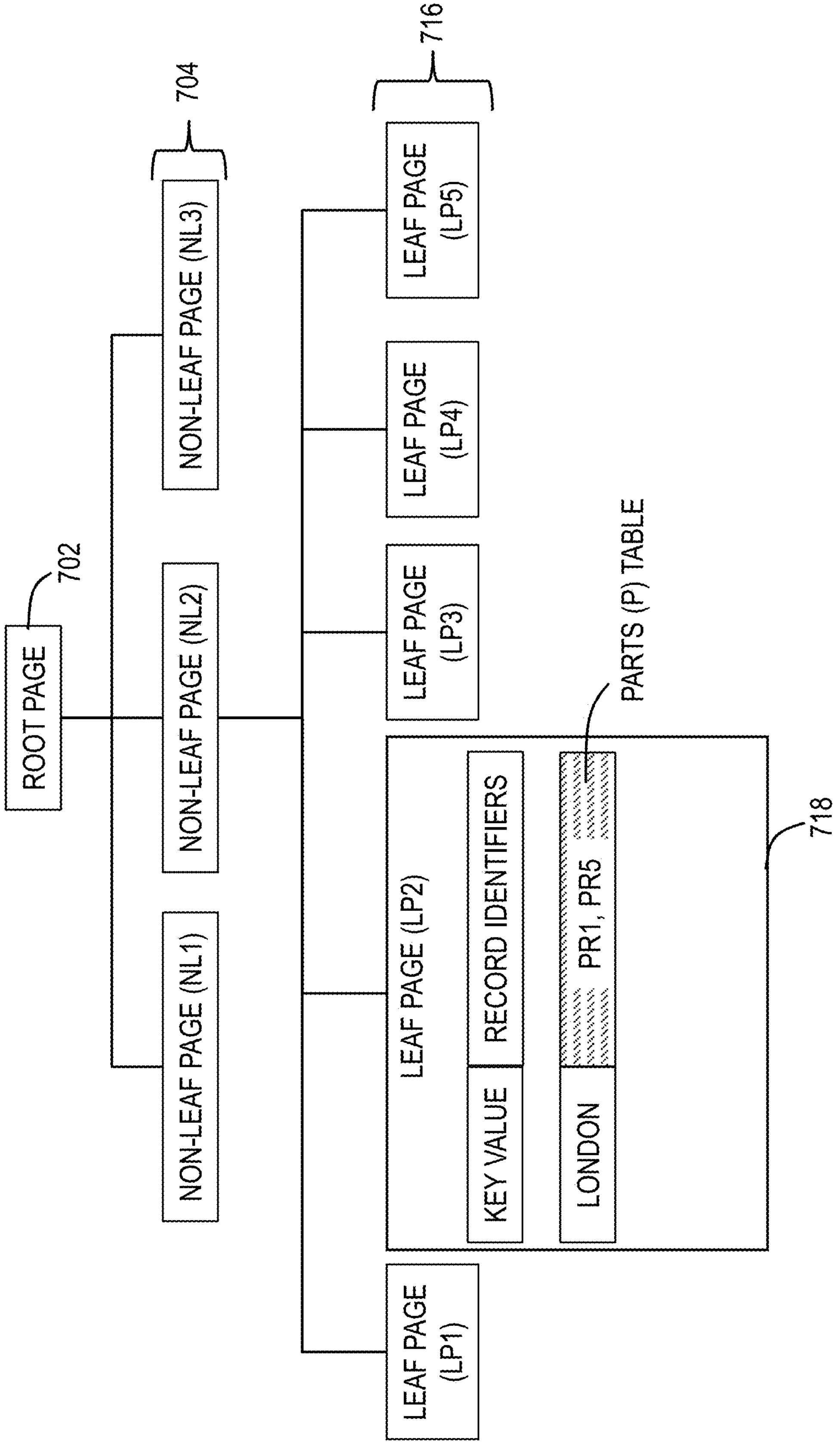
FIG. 7A depicts a block diagram of an example tree data structure for a new index built for a single table according to one or more embodiments.
Figure 7B:
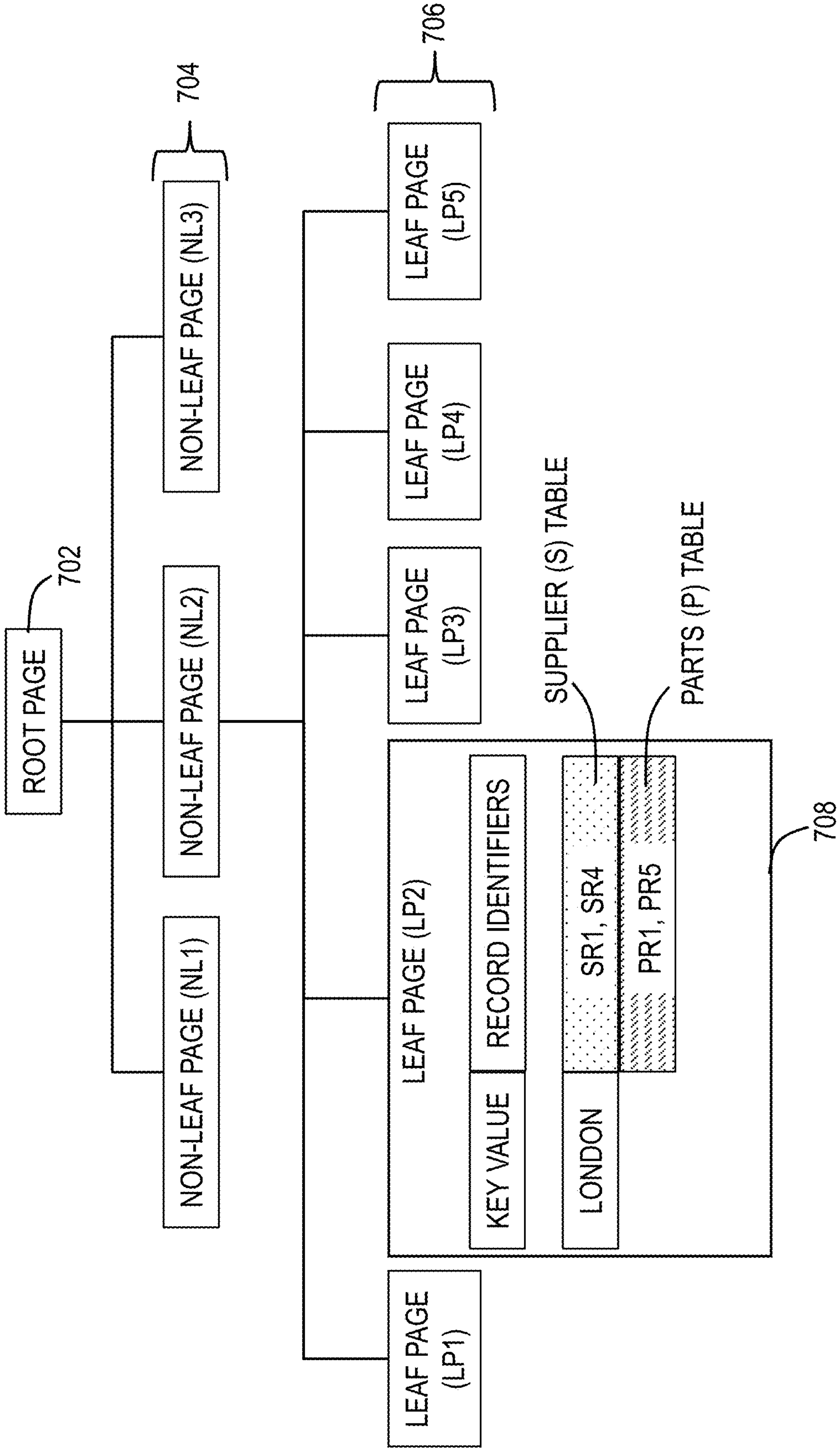
FIG. 7B depicts a block diagram of an example tree data structure for a multi-object index according to one or more embodiments.

FIG. 7B depicts an example data structure for the multi-object index 222 according to one or more embodiments. As seen in FIG. 7B, this is a tree-like data structure for the multi-object index 222 that has a hierarchy of nodes. The multi-object index 222 can be a B-tree index structure. In hierarchical order, the data structure has a root page 702 at the top, followed by non-leaf pages 704, and then leaf pages 706, which all contain respective information as understood by one of ordinary skill in the art.

The root page 702 is the culmination of non-leaf pages, meaning it represents the highest level of the index structure as a single non-leaf page. The root page contains the identification of all the non-leaf pages and their respective highest keys. The highest keys or key values for a non-leaf page is the first key value on the non-leaf page. Accordingly, the root page 702 contains the highest key or key value for each non-leaf page in the B-tree structure. Also, the root page serves as the entry point for a matching index scan, guiding the traversal through the index B-tree structure. It is noted that each non-leaf page in an index tracks a specific number of leaf pages and stores the highest key value from each tracked leaf page, along with its corresponding leaf page information. This hierarchical structure of storing the highest key values goes all the way up ending in a single root page.

Non-leaf pages contain the information of the highest key values that are stored in (lower) leaf pages. Because the non-leaf page is finite, each non-leaf page tracks a limited number of leaf page information. For example, if a non-leaf page can track information for 200 leaf pages, specifically identification of each leaf page (e.g., leaf page L1, leaf page L2, leaf page L3, etc.) and its highest key value, then for a total of 20,000 leaf pages, the required number of non-leaf pages would be approximately 100. In some cases, there can be multiple levels of non-leaf pages with each level tracking the non-leaf pages in a lower level.

Each of the leaf pages 706 has column key values of columns and record identifiers corresponding thereto. Leaf pages contain the sorted column key values along with the record identifiers, which are the addresses of the rows in tables page. The database software 204 is configured to read all the leaf pages 706 of the multi-object index 222 and filter the record identifiers (RIDS) corresponding to the column key value LONDON for the supplier table(S) and parts table (P), all in the same index. For illustration purposes, an enlarged leaf page 708 is depicted with column key value LONDON and with record identifiers for two different tables, which are supplier table(S) and parts table (P), although it should be appreciated that all leaf pages, all non-leaf pages, and the root page contain their respective information as discussed herein. Leaf the supplier table, where S denotes the record identifiers R1 and R4 for the supplier table. Also, leaf page 708 illustrates the record identifiers (e.g., second record identifiers) PR1 and PR5 for the parts table, where P denotes the record identifiers R1 and R5 for the parts table.

With the record identifiers SR1 and SR4 for the supplier table and the record identifiers PR1 and PR5 for the parts table, the database software 204 can access the supplier table to retrieve supplier table data and the parts table to retrieve parts table data according to the join condition of the database query 230, and then output the combination of the supplier table data and the parts table data according to the specified join operation. In this example scenario, the output of the JOIN operation is as follows: S1, SMITH, 20, LONDON and S4, CLARK, 20, LONDON from the supplier table; P1, NUT, RED, 12, LONDON and P5, CAM, BLUE, 12, LONDON from the parts table.

Figure 8:
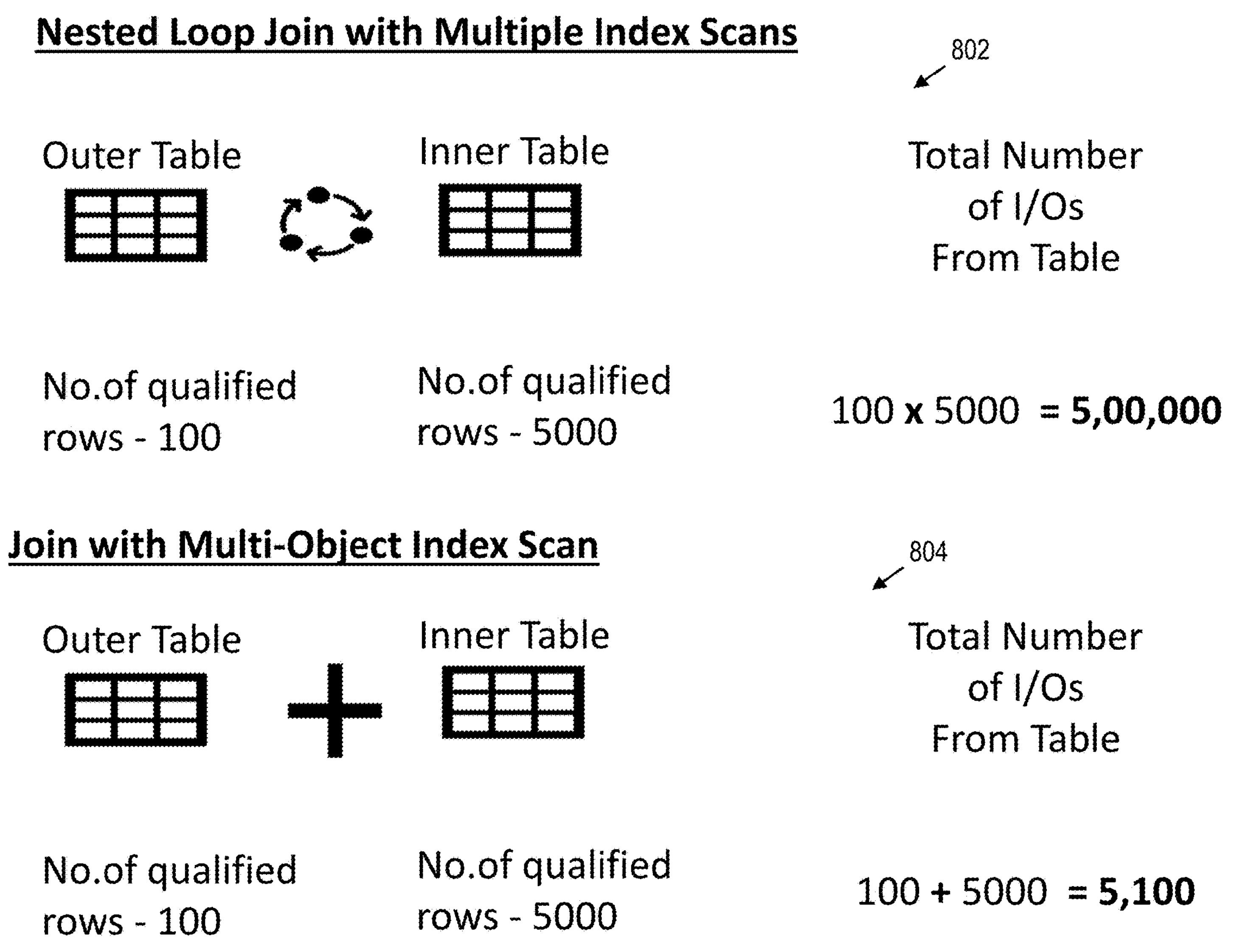
FIG. 8 depicts a block diagram of an example comparative analysis for a join operation with and without using the multi-object index according to one or more embodiments.

To further show the reduction in CPU usage and I/O processes using the multi-object index versus a traditional index, FIG. 8 depicts a comparative analysis according to one or more embodiments. In this example, a typical nested loop join with multiple index scans is compared to the join with multi-object index scan according to one or more embodiments. In the case of the nested loop join, the inner table (average no. of qualified rows y) is accessed for each of the outer table qualified rows (x) resulting in x*y input/output operations. In the case of the multi-object index, only a single pass of the index is required to obtain all the qualified rows resulting in x+y input/output operations. As seen in views 802 and 804, the outer table and inner table (e.g., tables A and B) have 100 qualified rows (e.g., qualified record identifiers) and 5000 qualified rows, respectively. In view 802, the nested loop join with multiple index scans requires a total number of I/O processes from the tables as 100×5000=5,000,000. However, in view 804, according to one or more embodiments, the join with multi-object index scan requires a total number of I/O processes from the tables as 100+5000=5,100, which is much less. This database operation on the computer system 202 is an improvement to the functioning of the computer system 202 itself by reducing CPU usage, reducing the number of I/O processes for the same join operation, and reducing the time (e.g., increasing the speed) to provide the desired output.

As illustrated, the nested loop join inherently leads to the multiplication of I/O operations involving the qualified record numbers from both the inner and outer tables. The database/evaluation engine 210, while looking at time consuming queries from inbuilt SQL caching structures (e.g., metadata database 220), determines the I/O intensive columns (fields) used for joining any 2 tables. In the illustrated example of FIGS. 4, 5, and 6, the JOIN column is CITY, and a multi-object index containing pointers to the supplier table and parts table is created for the CITY columns (e.g., S.CITY and P.CITY) in both tables. By leveraging the suggested multi-object index, the I/O operations become cumulative, leading to a significant reduction in overall I/O operations and consequently enhancing the overall query performance. As the number of joined tables in the query increases, the advantages of employing the multi-object index become even more valuable by reducing the number of I/O processing and reducing CPU usage (as compared to not utilizing the multi-object index for the join operation).

The multi-object indexes are intended to be built proactively based on a pattern of usage for frequently used JOIN columns and JOIN values. The pattern of usage refers to the frequency of join columns (e.g., the first column of the first table and the second column of the second table) for a join operation, where the frequency meets a predefined frequency threshold for building the multi-object index. The join value(s) refer to the column key value(s) of a column in table (e.g., a particular city in the city column). The pattern of usage for join columns can be retrieved from the metadata database 220. The multi-object indexes are ephemeral and are destroyed (e.g., deleted from memory) when the queries benefited by the multi-object index become less than the predefined frequency threshold.

Multi-object indexes are structures that can be created in two modes, which are sandcastle mode (e.g., temporary mode) and full table mode. When created in sandcastle mode, multi-object indexes are built only on the mostly frequently used join column key values, which could meet a predefined frequency threshold or could be the top mostly frequently used join column key values of a predefined percentage (e.g., top 5%, top 10%, top 15%, etc.). The sandcastle mode (e.g., temporary mode) may be employed in a situation where the queries are very dynamic and JOIN columns keep changing. The multi-object indexes created in this mode are short lived.

When multi-object indexes are created in full table mode, this is employed under the following conditions: (i) Queries and JOIN patterns are predictable and stable; (ii) there are existing indexes (e.g., that are not multi-object indexes) on the two tables (involved in a JOIN) on the JOIN column key values; (iii) the tables involved in a JOIN are mostly read-only; and (iv) the tables are suitable for reporting applications that run against a data-warehouse. Stable tables are tables that are rarely updated. For example, data warehousing tables are updated once a day or week. The AI engine 232 can exploit the real-time statistics to ascertain the nature of the table, for example, as being mostly read-only. Data warehousing tables that are determined as read-only are typically used by applications. Under full table mode, the existing index entries of two tables involved in a JOIN are read and merged.

Now turning to building the multi-object index, there are two examples method for building the multi-object index that are discussed. As discussed herein, the multi-object index includes the indexes of two or more tables for their respective column key values (e.g., first and second column key values). Following the example of a first column key value for a first table and a second column key value for a second table, the multi-object index can be built by reading the first and second column key values in the first and second tables respectively, in order to obtain first and second record identifiers. This process continues until the first record identifiers for the first table and second record identifiers for the second table are placed in leaf nodes.

Figure 9:
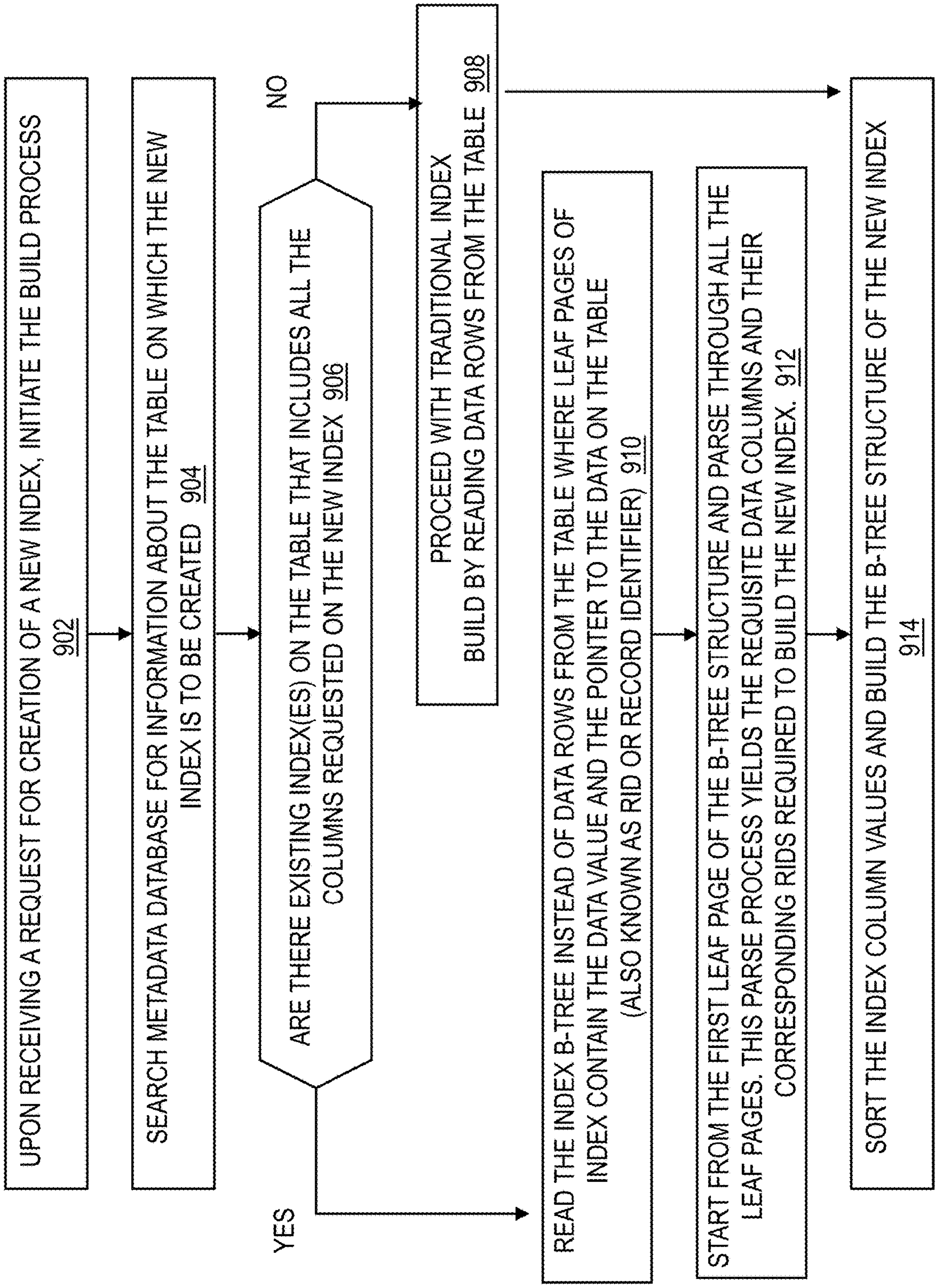
FIG. 9 depicts a flowchart of a computer-implemented method for a smart index build according to one or more embodiments.

As another example, a smart index build method can be utilized to build any type of index including the multi-object index 222 for two or more tables and/or a new index (e.g., new index 224) for a single table. FIG. 9 is a flowchart of a smart index build method 900 for building a new single-object index for a single table or a multi-object index for two or more tables in accordance with one or more embodiments.

At block 902, the database software 204 is configured to, upon receiving a request for creation of a new index, initiate the smart index build process. The request may be for one or more columns of a single table for a new index build. Also, the request may be for two or more columns of two or more tables for a multi-object index build. The database software 204 can call or employ the index build module 212 to build the new index. In one or more embodiments, the request can be received from a user as a user-initiated request that is a command to create a new index, the request can be received from the AI engine 232 because of a frequency of use for a column or columns, etc. At block 904, the database software 204 is configured to search the metadata database 220 for information about the table or tables on which the new index is to be created.

At block 906, the database software 204 is configured to check whether there is an existing index on the table (and/or are existing indexes on the tables) that includes all the columns requested on the new index. This is a check to determine if the requested column or columns on which the new index is to be built are already present in an existing index or indexes. When the database software 204 receives a request to create a new index (which could be a multi-object index), it verifies the metadata in the metadata database 220 for existing indexes with the same columns or column key values. For example, the column from the supplier table is CITY (e.g., S.CITY), while the column for the parts table is CITY (e.g., P.CITY), with reference to the example database query in FIG. 6. For building a new index for a single table, the column could be CITY from the parts table.

At block 908, when (NO) all the columns requested are not present in an existing index of a table and/or existing indexes of tables, the flow proceeds with a traditional index build from the table. As noted herein, the smart index build can be for a single column of a single table or two or more columns of two or more tables in which each table has at least one column. During the traditional index build, the data from the table is read and the column key values (or index keys) of the column are extracted along with the address in the table. As noted herein, the address is referred to as the record identifier (RID). The database sorts the information following the traditional build. The AI engine 232 can refer to metadata database 220 to provide input on the existence of the column in the existing index.

At block 910, when (YES) all the columns requested are present or found for an existing index of a table and/or existing indexes of tables, the database software 204 is configured to read the index B-tree of the existing index for a table (or existing indexes for tables) instead of row data from the table (or tables), where the leaf pages of the existing index (indexes) contain the data value (e.g., column key value) and the pointer (also known as record identifiers) to the row data on the table. This eliminates the need to read table data. During the smart index build, the database software 204 is configured to utilize the existing information of the existing index (or indexes), where the column key values (index key values) and record identifiers are already available in the existing index and are to be utilized instead of going to the table (itself) to read all data. At blocks 912 and 914, the database software 204 is configured to start from the first leaf page (e.g., leaf page L1) of the B-tree structure of the existing index (or indexes), parse through all the leaf pages, sort the index column key values, and build the B-tree structure of the new index. The parse process yields the requisite data columns and their corresponding record identifiers to build the new index. The new index (e.g., new index 224) is stored in memory such as in system memory 103, mass storage 110, and/or any other database system.

In the example scenario for building a new index for a single table, it is assumed that the existing index is built on CITY and PNAME of the parts table, and the new index (e.g., new index 224) is being built on CITY of the parts table using the smart index build. The index build module 212 is configured to read the leaf pages (e.g., leaf page data) of the existing index for the parts table and extract CITY key values along with the corresponding row addresses (e.g., pointers) in parts table. This information (e.g., the leaf page data from the parts table) is utilized to build the new index structure starting with building the leaf pages such as the example leaf pages 716 depicted in FIG. 7A. The column key value, such as LONDON, for the column is stored in the leaf page along with the record identifiers for the parts table. For example, leaf page 718 depicts PR1 and PR5 as record identifiers for rows in the parts table, as shown in FIG. 7A. Because the existing index (e.g., index A of repository 282A) was sorted on PNAME first and then on CITY, the existing index is not able to be utilized for an SQL query on CITY for the parts table, and this is because the database software would not find the column key value for CITY in the root node of the existing index. However, the new index in FIG. 7A is sorted on the column CITY, and a new SQL query can find the requested column key value for the column CITY in the root node of the new index. Also, databases or database tables are subject to locking when another application is reading the database, but the smart index build reads leaf pages from an existing index and is not subject to locking. In one or more embodiments, after building the new index, the index build module 212 is configured to read a log of changes for the table (e.g., parts table) and read the specific rows that have been changed in the table in order to update the new index with any changed record identifiers.

When building a new multi-object index, the index build module 212 is configured to read the leaf pages (e.g., leaf page data) of the existing index of the supplier table and the existing index for the parts table and extract CITY key value along with the corresponding row address (e.g., pointers) in both tables. This information (e.g., the leaf page data from the respective tables) is utilized to build the new multi-object index structure starting with building the leaf pages such as the example leaf pages 706 depicted in FIG. 7B. The column key values, such as LONDON, for the column is stored in the leaf page along with the record identifiers for each table. For example, leaf page 708 depicts SR1 and SR2 as record identifiers for rows in the supplier table and PR1 and PR5 as record identifiers for rows in the parts table, as shown in FIG. 7B.

The smart build approach can be used for the multi-object index where the index build module 212 combines leaf page data from existing indexes (e.g., two or more indexes for different tables), streamlining and accelerating the creation of the new multi-object index as depicted in FIG. 7B. Also, the same approach can be used to build a new index (e.g., new index 224) from an existing index of the same single table (e.g., table A) as depicted in FIG. 7A.

Although there is an existing index for a given table, there may be a case in which the column being used in the WHERE clause of the SQL (called the predicate column) is not the starting column of the existing index. Accordingly, the B-tree traversal starting with the root page is not possible; this case is a non-matching index scan. In this case, the present disclosure can use the smart build index method to build a new single index for the given table such that the desired column key value is present as the starting column of the index enabling a scan from the root page. Therefore, when a scan of the root page of the new index is performed by the database software, the desired column key value is found on the root page; this case is a matching index scan. For explanation purposes, example scenarios are discussed below.

An example scenario is considered for a matching index scan of an existing index to a supplier table (e.g., has table pages), where the existing index for the parts table has index columns for CITY and PART NAME. As discussed for a B-tree structure, the existing index includes a root page, non-leaf pages below the root page, and leaf pages below the non-leaf pages. For the existing index, each unique combination of CITY and PART NAME in the supplier table, along with the corresponding row address in table pages, is stored in the leaf pages in a sorted order (e.g., alphabetical order) based on the column key values. If a user wishes to know the part names available in Dubai, an SQL query is written as the following: SELECT PART_NAME FROM SUPPLIER_TABLE WHERE CITY='DUBAI'. It may be assumed that the required information is available in leaf page L2, where there could be leaf pages L1, L2, L3, etc., but how does the system know to access the needed leaf page L2. The database system has to access the leaf page L2, which contains the required information, and this is done by performing a scan of the existing index starting from the root page. As an example of a matching scan in which the scan of the existing index finds the required information, the column key value 'DUBAI' is compared with the keys in the root page to identify the appropriate non-leaf page containing the required information. The information in the non-leaf pages is used to directly locate the leaf page containing the key 'DUBAI' along with its corresponding row address. Using the corresponding row addresses of 'DUBAI' in the leaf page L2, tables rows of the table are accessed.

An example scenario is considered for a non-matching index scan of an existing index to a supplier table (e.g., having table pages), where the existing index for the supplier table has index columns for CITY and PART NAME. If a user wants to know in which cities the part name 'BOLT' is available, an SQL query is written as the following: SELECT CITY FROM SUPPLIER_TABLE WHERE PART_NAME='BOLT'. A gain, it may be assumed that the required information is available in leaf page L2 (where there could be leaf pages L1, L2, L3, etc.,) but how does the system access the needed leaf page L2. Unlike the previous example scenario above, because the first key value of the SQL query is not provided in the keys of the root page to identify the appropriate non-leaf page, B-tree traversal starting with root page is not possible; therefore, this is a non-matching index scan. Accordingly, this existing index cannot be utilized to answer the SQL query when performing an index scan, although the required information may be available in one of the leaf nodes such as leaf node L2.

Suppose that a new index for the supplier table is requested to be built using the smart index build method, such that the new index has PART NAME as the key value in the root page; this would allow the following SQL query to be fulfilled (unlike the non-matching index scan): SELECT CITY FROM SUPPLIER_TABLE WHERE PART_NAME='BOLT'. Using the smart index build method, the database software 204 which may call the index build module 212 is configured to read and/or cause all the leaf pages to be read for the existing index of the supplier table that has index columns for CITY and PART NAME. By reading the leaf pages of the existing index, the database software 204 obtains the column key values and their corresponding record identifiers (including pointers) to the table data of the supplier table. The database software 204 builds the new index using the leaf pages of the existing index, while ensuring that the root page contains the desired key value as one of the highest key values. For example, the present disclosure expects the first leaf page to be reached via the root page and all the intervening non-leaf pages. Thereafter, a chain of leaf pages are read sequentially to obtain the keys required to build the new index.

Figure 10:
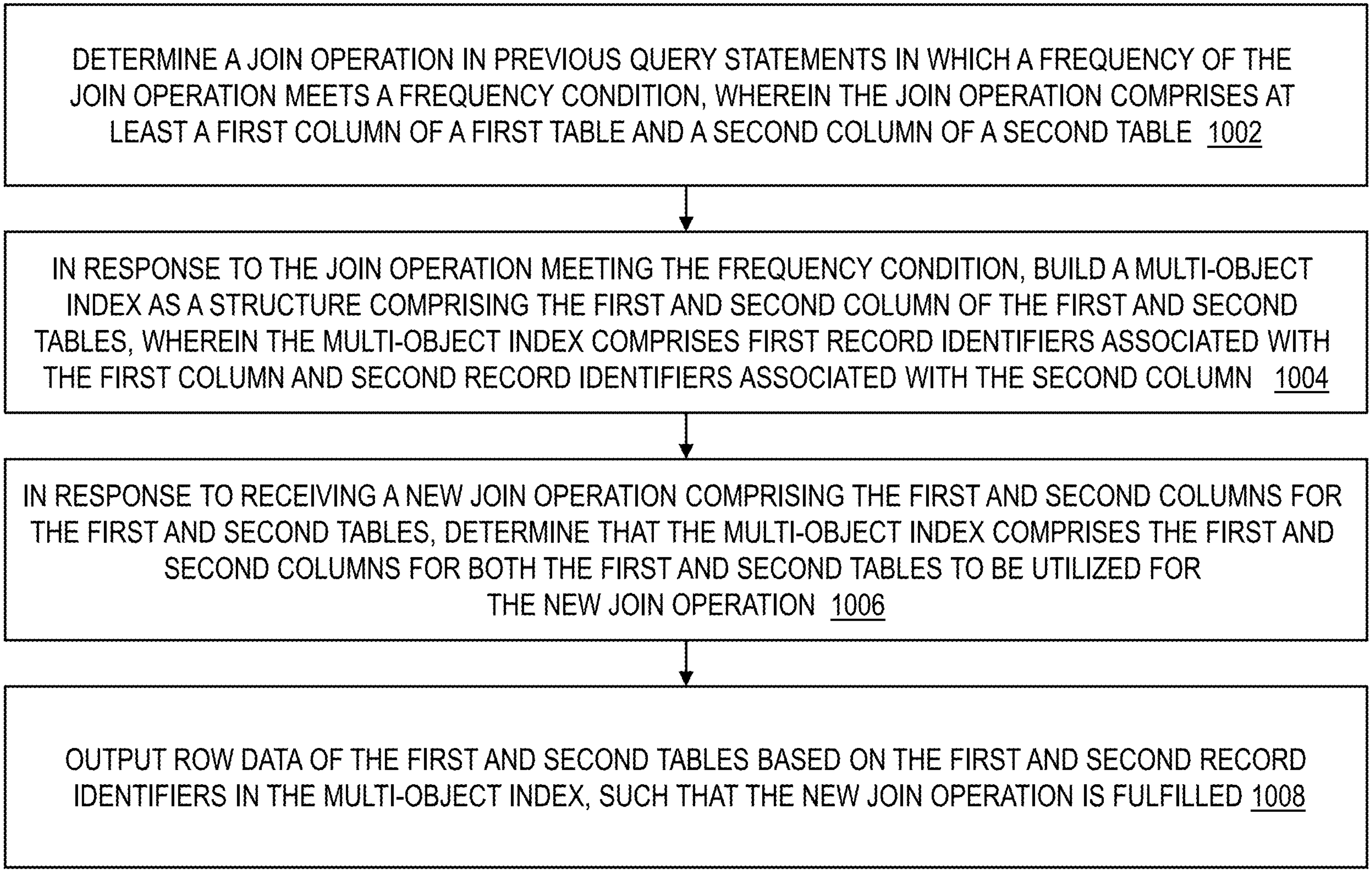
FIG. 10 depicts a flowchart of a computer-implemented method according to one or more embodiments.

FIG. 10 depicts a flowchart of a computer-implemented method 1000 for dynamically (in real-time or near real-time) accelerating database join performance of tables on a computer system using a multi-object index such that the requested table data of the join request is returned to the user faster, by utilizing fewer CPU resources and fewer I/O processes according to one or more embodiments.

In one or more embodiments, the computer-implemented method 1000 can be executed by the computer system 202 on behalf of and in conjunction with the user device 252. The user device 252 can communicate with the computer system 202 in order to cause the computer system 202 to assist with execution of one or more tasks, for example, in a client server relationship, by submitting a database query (e.g., SQL query). In response to executing the database query, the computer system 202 can return the requested table data to the user device 252 and cause the table data to be displayed in a graphical user interface of the user device 252. Reference can be made to any figures discussed herein.

Turning to FIG. 10, at block 1002 of the computer-implemented method 1000, the database software 204 of computer system 202 is configured to determine a join operation in pre-existing query statements in which a frequency of the join operation meets a frequency condition, where the join operation includes at least a first column (e.g., CITY or S.CITY) of a first table (e.g., supplier table as table A) and a second column (e.g., CITY or P.CITY) of a second table (e.g., parts table as table B). For example, metadata about the pre-existing query statements can be stored in the metadata database 220 such that a frequency of the join operation for the pre-existing query statements can be obtained. In one or more embodiments, the pre-existing query statements have been executed in the past and are historical data.

At block 1004, the database software 204 is configured to, in response to the join operation meeting the frequency condition, building a multi-object index (e.g., multi-object index 222) as a structure comprising the first and second column of the first and second tables, where the multi-object index includes first record identifiers associated with the first column and second record identifiers associated with the second column.

At block 1006, the database software 204 is configured to, in response to receiving a new join operation including the first and second columns for the first and second tables, determining that the multi-object index includes the first and second columns for both the first and second tables to be utilized for the new join operation. In one or more embodiments, the database management system optimizer 208 can check and verify the presence of a suitable multi-object index having the first and second columns by checking the multi-object index manager 214. The multi-object index manager 214 maintains and stores a record of every multi-object index 222.

At block 1008, the database software 204 is configured to output row data of the first and second tables (e.g., the supplier table and the parts table) based on the first and second record identifiers in the multi-object index, such that the new join operation is fulfilled. Instead of accessing rows of the supplier table and parts tables with numerous I/O processes, the database software 204 accesses the supplier table and parts tables using the first and second record identifiers (e.g., pointers) respectively.

Further, building the multi-object index as the (B-tree) structure includes building the multi-object index from a first index of the first table (e.g., an existing supplier index (e.g., index A) of the supplier table) and a second index of the second table (e.g., an existing parts index (e.g., index B) of the parts table), where the first and second indexes are different. For example, the smart index build process can be utilized.

The database software 204 is configured to extract the first record identifiers from the first index (e.g., supplier index as index A) and the second record identifiers from the second index (e.g., parts index as index B), where the multi-object index 222 is built using the first and second record identifiers that have been extracted without parsing the first and second tables.

Building the multi-object index 222 from the first index of the first table and the second index of the second table includes parsing first leaf nodes of the first index (e.g., index A) and second leaf nodes of the second index (e.g., index B) in order to respectively extract the first record identifiers from the first index and the second record identifiers.

The frequency of the join operation corresponds to past occurrences (e.g., stored in the metadata database 220) of the join operation for the first and second columns. The frequency condition corresponds to a predefined threshold, the predefined threshold reflecting a number of the past occurrences (e.g., stored in the metadata database 220) within a predefined time period.

Building the multi-object index includes parsing the first and second tables to obtain the first record identifiers associated with the first column and the second record identifiers associated with the second column. A traditional index build process can be utilized that requires multiple I/O processes to access the first table and the second table.

Figure 11:
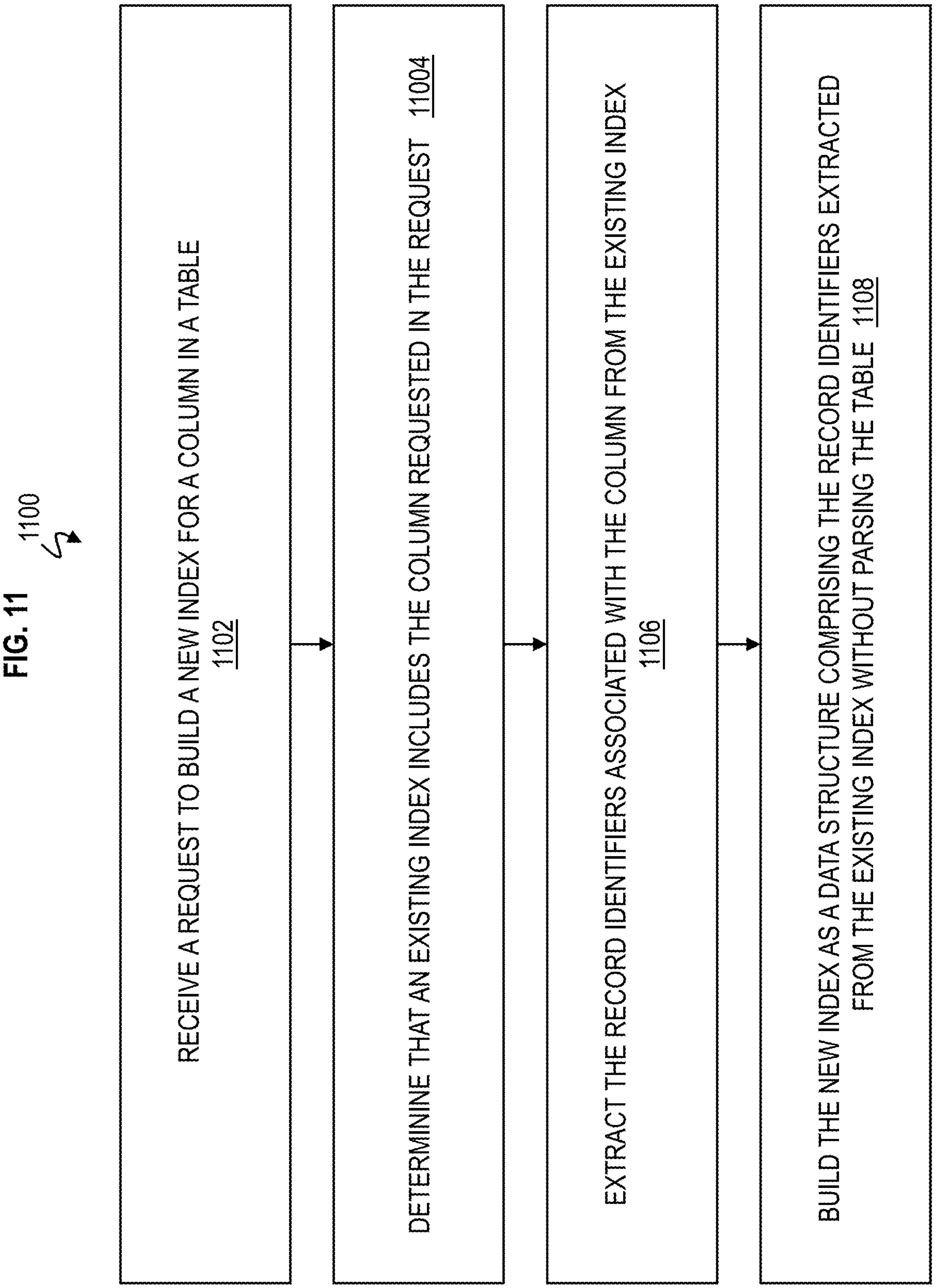
FIG. 11 depicts a flowchart of a computer-implemented method according to one or more embodiments.

FIG. 11 depicts a flowchart of a computer-implemented method 1100 of a smart index build for dynamically (in real-time or near real-time) building a new index on a table (or two or more tables for a multi-object index) on a computer system such that the new index is utilized to respond to a database query (e.g., SQL query) to the table faster with output (e.g., row data) to the user, by utilizing fewer CPU resources and fewer I/O processes according to one or more embodiments.

In one or more embodiments, the computer-implemented method 1100 can be executed by the computer system 202 in response to receiving a request to build a new index as discussed in FIG. 9. Once the new index (e.g., new index 224) is built, the user device 252 can communicate with the computer system 202 in order to cause the computer system 202 to assist with execution of one or more tasks, for example, in a client server relationship, by submitting a database query (e.g., SQL query). In response to executing the database query, the computer system 202 can return the requested table data to the user device 252 and cause the table data to be displayed in a graphical user interface of the user device 252. Reference can be made to any figures discussed herein.

Referring to FIG. 11, at block 1102, the database software 204 is configured to receive a request to build a new index (e.g., new index 224) for a column in a table (e.g., table A in repository 280A). At block 1104, the database software 204 is configured to determine that an existing index (e.g., index A or index 282A) includes the column requested in the request to build the new index. At block 1106, the database software 204 is configured to extract the record identifiers (RIDs) associated with the column from the existing index (e.g., index A). At block 1108, the database software 204 is configured to build the new index as a data structure comprising the record identifiers extracted from the existing index without parsing the table (e.g., table A). For example, the new index 224 is output and stored in memory as a new data structure that is accessible for database queries (e.g., SQL queries) to the table (e.g., table A) to find the row data for the requested column(s) in the table without having to read the entire table.

Further, the new index is different from the existing index. For example, although the new index 224 and the existing index (e.g., index A) may be related to at least one of the same columns, the leaf pages, non-leaf pages, and root page are different.

Extracting the record identifiers (RIDS) associated with the column from the existing index comprises extracting the record identifiers and column key values from existing leaf pages of the existing index while avoiding input and output (I/O) processes to the table (e.g., table A). For example, the smart index build does not require the database software 204 to access table A with I/O processes when building the new index 224. The new index comprises the record identifiers extracted from the existing index, the record identifiers in the new index being sorted in a different arrangement than in the existing index.

The new index comprises a new root page, new non-leaf pages coupled in a hierarchy to the root page, and new leaf pages coupled in the hierarchy to the new non-leaf pages such that the new root page comprises a new plurality of highest column key values; the existing index comprises an existing root page, existing non-leaf pages coupled in an existing hierarchy to the existing root page, and existing leaf pages coupled in the existing hierarchy to the existing non-leaf pages such that the existing root page comprises an existing plurality of highest column key values. The new plurality of highest column key values in the new root page are different from the existing plurality of highest column key values in the existing root page.

Additionally, the new leaf pages comprise column key values for the column; and a difference in the new root page and the existing root page is based on the column key values in the new leaf pages being sorted in a different arrangement from the existing leaf pages, thereby resulting in the new plurality of highest column key values being different from the existing plurality of highest column key values. As a further example, FIG. 12 depicts an example of a new index 1212 sorted in a different arrangement than an existing index 1202 according to one or more embodiments. The existing index 1202 can be one of the indexes 282, and the new index 1212 can be an example of the new index 224 discussed herein. Using the smart index build, the index build module 212 is configured to build the new index 1212 from the existing leaf nodes of the existing index 1202 with columns for CITY and STATE. The existing index 1202 is built with a different arrangement than the new index 1212, as can be seen in FIG. 12. The existing index 1202 is sorted by CITY while the new index 1212 is sorted by STATE, which causes the two indexes to have a different B-tree structure for the root page, non-leaf pages, and leaf pages.

For example, the new leaf pages of new index 1212 comprise column key values for the column STATE, and a difference in the new root page and the existing root page is based on the column key values in the new leaf pages being sorted in a different arrangement from the existing leaf pages, thereby resulting in the new plurality of highest column key values being different from the existing plurality of highest column key values. This difference arises because of the change in column ordering between the existing index 1202 on (CITY, STATE) and the new index 1212 on (STATE, CITY), where the leading sorted column has shifted from CITY to STATE. As a result, the B-tree structure of new index 1212 reflects a different distribution and hierarchy of keys, leading to variations in both leaf and root page content when compared to the existing index 1202.

As an example, it may be assumed that the existing and new root pages are five column key values down from the top column key value. This means that the existing index 1202 has an existing root page that includes the highest column key value "Portland" while the new index 1212 has a new root page that includes the highest column key value "Minnesota." One the root page is established, the non-leaf pages and leaf page are built based on the root page, for example from both sides of the root page as understood by one of ordinary skill in the art.

As another example, the new index 1212 being in a different arrangement from the existing index 1202, the new index 1212 may include fewer columns than the existing index 1202. In one or more embodiments, the new index 1212 may only include the column STATE.

Also, in response to receiving a query statement (e.g., SQL query) having a given column key value for the column in the table, a search finds the new index having a root page with the given column key value while the search is unsuccessful in finding the given column key value in an existing root page of the existing index; in response to reading leaf pages of new index, one or more of the record identifiers associated with the given column key value are found in the new index. Row data of the table (e.g., table A) is output based on the one or more of the record identifiers associated with the given column key value found in the new index. For example, the database software 204 can receive an SQL query for the column and the given column key value of the column and can check to determine that the given column key value is present in the new root page of the new index 224 (which is not in the existing root page of the existing index (e.g., index A). As such, the database software 204 reads new leaf pages to find the record identifiers the given column key value of the column and extracts the corresponding row data from table A, without having to read the entire table A. The database software 204 can transmit the row data of the record identifiers for the given column key value to the user device 252A and cause the row data to be displayed on the display screen of the user device 252A, in response to the database software 204. The row data is the answer/response to the SQL query.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 13:
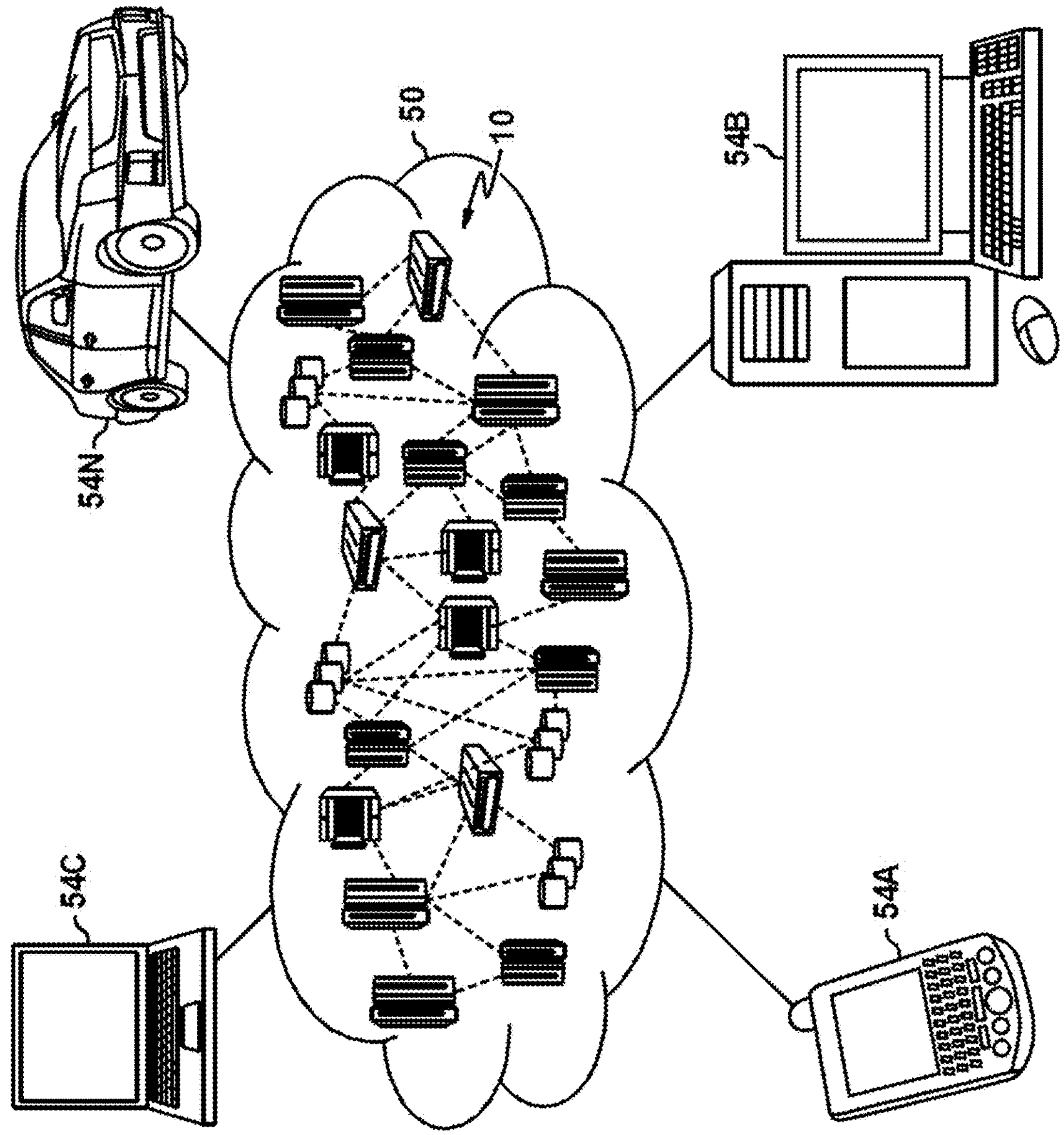
FIG. 13 depicts a cloud computing environment according to one or more embodiments of the present invention.

Referring now to FIG. 13, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described herein above, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 13 are intended to be illustrative only and that computing nodes 10 and cloud computing environment 50 can communicate with any type of computerized device over any type of network and/or network addressable connection (e.g., using a web browser).

Figure 14:
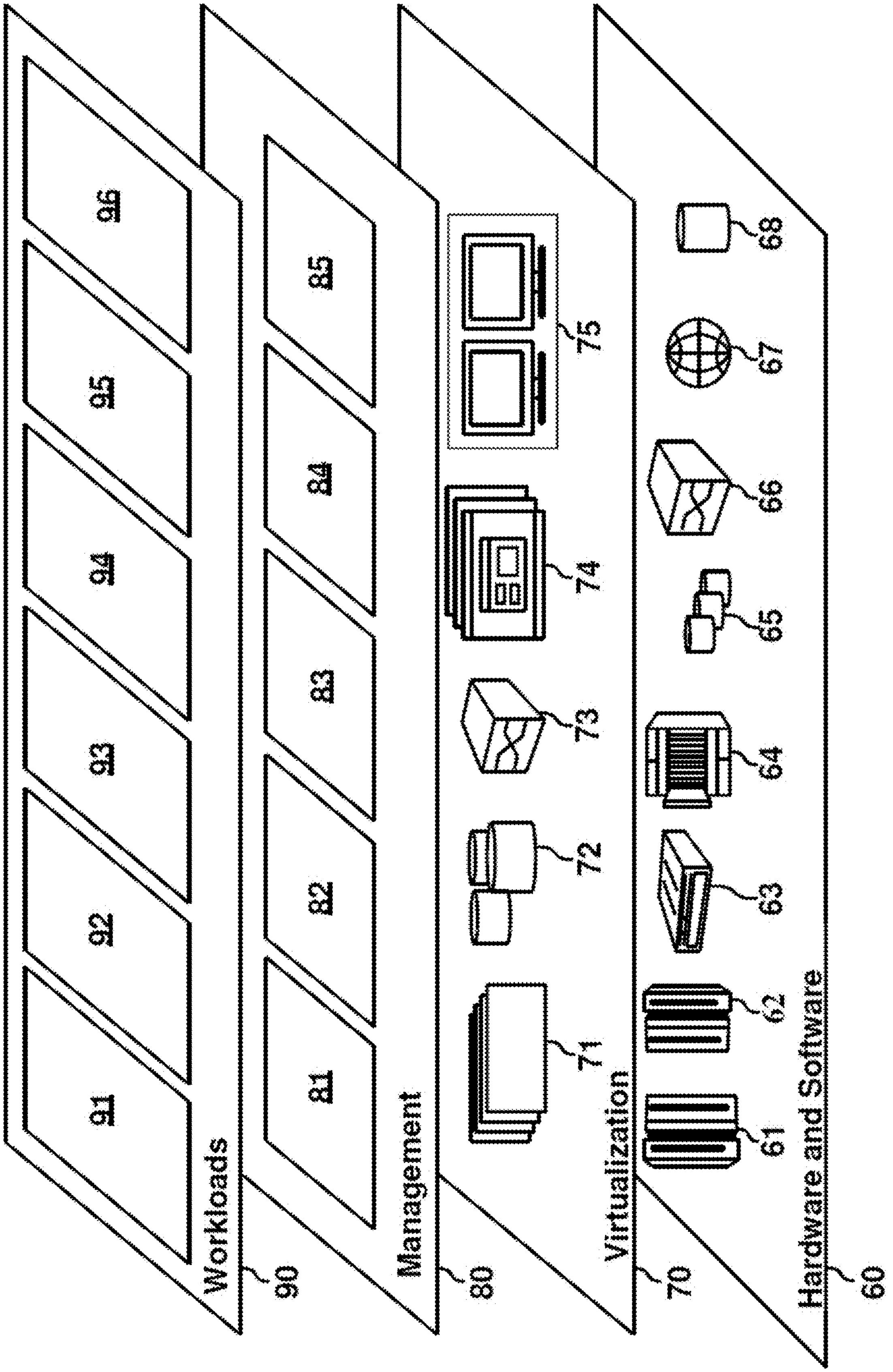
FIG. 14 depicts abstraction model layers according to one or more embodiments of the present invention.

Referring now to FIG. 14, a set of functional abstraction layers provided by cloud computing environment 50 (depicted in FIG. 13) is shown. It should be understood in advance that the components, layers, and functions shown in FIG. 14 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. U ser portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and workloads and functions 96. One or more aspects of embodiments may be executed, at least in part, by workloads and functions 96. In one or more embodiments, the database software 204 can utilize, be executed as, and/or be integrated with workloads and functions 96.

Various embodiments of the present invention are described herein with reference to the related drawings. Alternative embodiments can be devised without departing from the scope of this invention. Although various connections and positional relationships (e.g., over, below, adjacent, etc.) are set forth between elements in the following description and in the drawings, persons skilled in the art will recognize that many of the positional relationships described herein are orientation-independent when the described functionality is maintained even though the orientation is changed. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for the purposes of illustration and description but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagrams or the steps (or operations) described therein without departing from the spirit of the disclosure. For instance, the actions can be performed in a differing order or actions can be added, deleted, or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, e.g., one, two, three, four, etc. The terms "a plurality" are understood to include any integer number greater than or equal to two, e.g., two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. M any modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:

receiving a request to build a new index for a column in a table stored in memory, wherein the request to build the new index is generated by an artificial intelligence (AI) engine based on a frequency of use for the column requested in the table;

checking whether an existing index on the table includes the column requested in the request to build the new index generated by the AI engine;

in response to the checking, determining that the existing index includes the column requested in the request;

extracting record identifiers associated with the column from the existing index; and building the new index as a data structure comprising the record identifiers extracted from the existing index without parsing the table; and causing data from the table in the memory to be displayed on a user device, based on the new index.

2. The computer-implemented method of claim 1, wherein the new index is different from the existing index.

3. The computer-implemented method of claim 1, wherein the extracting the record identifiers associated with the column from the existing index comprises extracting the record identifiers and column key values from existing leaf pages of the existing index while avoiding input and output processes to the table.

4. The computer-implemented method of claim 1, wherein the new index comprises the record identifiers extracted from the existing index, the record identifiers in the new index being sorted in a different arrangement than in the existing index.

5. The computer-implemented method of claim 1, wherein:

the new index comprises a new root page, new non-leaf pages coupled in a hierarchy to the new root page, and new leaf pages coupled in the hierarchy to the new non-leaf pages such that the new root page comprises a new plurality of highest column key values;

the existing index comprises an existing root page, existing non-leaf pages coupled in an existing hierarchy to the existing root page, and existing leaf pages coupled in the existing hierarchy to the existing non-leaf pages such that the existing root page comprises an existing plurality of highest column key values; and the new plurality of highest column key values in the new root page are different from the existing plurality of highest column key values in the existing root page.

6. The computer-implemented method of claim 5, wherein:

the new leaf pages comprise column key values for the column; and a difference in the new root page and the existing root page is based on the column key values in the new leaf pages being sorted in a different arrangement from the existing leaf pages, thereby resulting in the new plurality of highest column key values being different from the existing plurality of highest column key values.

7. The computer-implemented method of claim 1, wherein:

in response to receiving a query statement having a given column key value for the column in the table, a search finds the new index having a root page with the given column key value while the search is unsuccessful in finding the given column key value in an existing root page of the existing index;

in response to reading leaf pages of the new index, one or more of the record identifiers associated with the given column key value are found in the new index; and row data of the table is output based on the one or more of the record identifiers associated with the given column key value found in the new index.

8. A system comprising:

one or more memories having computer readable instructions; and one or more processors for executing the computer readable instructions, the computer readable instructions when executed cause the one or more processors to perform operations comprising:

receiving a request to build a new index for a column in a table stored in memory, wherein the request to build the new index is generated by an artificial intelligence (AI) engine based on a frequency of use for the column requested in the table;

checking whether an existing index on the table includes the column requested in the request to build the new index generated by the AI engine;

in response to the checking, determining that the existing index includes the column requested in the request;

extracting record identifiers associated with the column from the existing index;

building the new index as a data structure comprising the record identifiers extracted from the existing index without parsing the table; and causing data from the table in the memory to be displayed on a user device, based on the new index.

9. The system of claim 8, wherein the new index is different from the existing index.

10. The system of claim 8, wherein the extracting the record identifiers associated with the column from the existing index comprises extracting the record identifiers and column key values from existing leaf pages of the existing index while avoiding input and output processes to the table.

11. The system of claim 8, wherein the new index comprises the record identifiers extracted from the existing index, the record identifiers in the new index being sorted in a different arrangement than in the existing index.

12. The system of claim 8, wherein:

the new index comprises a new root page, new non-leaf pages coupled in a hierarchy to the new root page, and new leaf pages coupled in the hierarchy to the new non-leaf pages such that the new root page comprises a new plurality of highest column key values;

the existing index comprises an existing root page, existing non-leaf pages coupled in an existing hierarchy to the existing root page, and existing leaf pages coupled in the existing hierarchy to the existing non-leaf pages such that the existing root page comprises an existing plurality of highest column key values; and the new plurality of highest column key values in the new root page are different from the existing plurality of highest column key values in the existing root page.

13. The system of claim 12, wherein:

the new leaf pages comprise column key values for the column; and a difference in the new root page and the existing root page is based on the column key values in the new leaf pages being sorted in a different arrangement from the existing leaf pages, thereby resulting in the new plurality of highest column key values being different from the existing plurality of highest column key values.

14. The system of claim 8, wherein:

in response to receiving a query statement having a given column key value for the column in the table, a search finds the new index having a root page with the given column key value while the search is unsuccessful in finding the given column key value in an existing root page of the existing index;

in response to reading leaf pages of the new index, one or more of the record identifiers associated with the given column key value are found in the new index; and row data of the table is output based on the one or more of the record identifiers associated with the given column key value found in the new index.

15. A computer program product comprising a computer readable storage medium having program instructions embodied therewith, the program instructions executable by one or more processors to cause the one or more processors to perform operations comprising:

receiving a request to build a new index for a column in a table stored in memory, wherein the request to build the new index is generated by an artificial intelligence (AI) engine based on a frequency of use for the column requested in the table;

checking whether an existing index on the table includes the column requested in the request to build the new index generated by the AI engine;

in response to the checking, determining that the existing index includes the column requested in the request;

extracting record identifiers associated with the column from the existing index;

building the new index as a data structure comprising the record identifiers extracted from the existing index without parsing the table; and causing data from the table in the memory to be displayed on a user device, based on the new index.

16. The computer program product of claim 15, wherein the new index is different from the existing index.

17. The computer program product of claim 15, wherein the extracting the record identifiers associated with the column from the existing index comprises extracting the record identifiers and column key values from existing leaf pages of the existing index while avoiding input and output processes to the table.

18. The computer program product of claim 15, wherein the new index comprises the record identifiers extracted from the existing index, the record identifiers in the new index being sorted in a different arrangement than in the existing index.

19. The computer program product of claim 15, wherein:

the new index comprises a new root page, new non-leaf pages coupled in a hierarchy to the new root page, and new leaf pages coupled in the hierarchy to the new non-leaf pages such that the new root page comprises a new plurality of highest column key values;

the existing index comprises an existing root page, existing non-leaf pages coupled in an existing hierarchy to the existing root page, and existing leaf pages coupled in the existing hierarchy to the existing non-leaf pages such that the existing root page comprises an existing plurality of highest column key values; and the new plurality of highest column key values in the new root page are different from the existing plurality of highest column key values in the existing root page.

20. The computer program product of claim 19, wherein:

the new leaf pages comprise column key values for the column; and a difference in the new root page and the existing root page is based on the column key values in the new leaf pages being sorted in a different arrangement from the existing leaf pages, thereby resulting in the new plurality of highest column key values being different from the existing plurality of highest column key values.

* * * * *